United States Patent
Lahav et al.

(10) Patent No.: US 10,841,427 B1
(45) Date of Patent: Nov. 17, 2020

(54) SMART CAPACITY FOR WORKLOAD ROUTING

(71) Applicant: LIVEPERSON, INC., New York, NY (US)

(72) Inventors: Shlomo Lahav, Tel Aviv (IL); Leor Gruendlinger, Tel Aviv (IL); Ofer Ron, New York, NY (US); Yehiel Cohen, Tel Aviv (IL); Liran Shaked, Tel Aviv (IL)

(73) Assignee: LIVEPERSON, INC., New York, NY (US)

( * ) Notice: Subject to any disclaimer, the term of this patent is extended or adjusted under 35 U.S.C. 154(b) by 0 days.

(21) Appl. No.: 16/857,454

(22) Filed: Apr. 24, 2020

Related U.S. Application Data

(60) Provisional application No. 62/838,522, filed on Apr. 25, 2019.

(51) Int. Cl.
*H04M 3/523* (2006.01)
*H04M 3/51* (2006.01)

(52) U.S. Cl.
CPC ................................. *H04M 3/5232* (2013.01)

(58) Field of Classification Search
CPC .. H04M 3/5232; H04M 3/5175; H04M 3/523; H04M 3/5238
USPC ............ 379/265.11, 265.14, 266.01, 265.05, 379/265.06, 265.01
See application file for complete search history.

(56) References Cited

U.S. PATENT DOCUMENTS

| | | | |
|---|---|---|---|
| 2004/0202309 A1* | 10/2004 | Baggenstoss | H04M 3/5238 379/265.06 |
| 2006/0233346 A1* | 10/2006 | McIlwaine | H04M 3/5238 379/265.02 |
| 2014/0337072 A1 | 11/2014 | Tamblyn et al. | |
| 2017/0220383 A1 | 8/2017 | Raj | |
| 2018/0115646 A1 | 4/2018 | Conway et al. | |

OTHER PUBLICATIONS

International Search Report and Written Opinion for PCT Application No. PCT/US2020/029723 dated Sep. 4, 2020, 9 pages.

* cited by examiner

*Primary Examiner* — Thjuan K Addy
(74) *Attorney, Agent, or Firm* — Polsinelli LLP

(57) ABSTRACT

Examples are described of smart capacity workload routing. One example involves storing a workload model in memory regarding a set of different factors associated with user communications, with each factor is associated with a measurement of workload. A received request including information regarding one or more of the factors is process and used in identifying a workload measurement for the requested user communication based on comparing the received request information to the stored workload model, and identifying an agent with capacity that is available to handle the requested user communication. A communication slot for the identified agent is activated and defined by the identified workload measurement. The request is then routed to the identified agent and updating available workload capacity in the system.

20 Claims, 16 Drawing Sheets

| SKILL | AGENT NAME | AGENT GROUP | LAST MESSAGE TIME | DURATION |
|---|---|---|---|---|
| SALES | MEL | SALES CONSULTING | 13 OCT. 2016 - 11:4... | 125:14 HR |
| SALES | JAMES | SALES CONSULTING | 13 OCT. 2016 - 3:08... | 02:11 MIN |
| SUPPORT | MEL | SALES CONSULTING | 12 OCT. 2016 - 6:07... | 3:40 HR |
| SUPPORT | MEL | SALES CONSULTING | 12 OCT. 2016 - 2:15... | 10:49 MIN |
| SALES | JAMES | SALES CONSULTING | 13 OCT. 2016 - 3:08... | 02:11 MIN |
| SUPPORT | MEL | SALES CONSULTING | 12 OCT. 2016 - 6:07... | 3:40 HR |
| SUPPORT | MEL | SALES CONSULTING | 12 OCT. 2016 - 2:15... | 10:49 MIN |
| SALES | MEL | SALES CONSULTING | 12 OCT. 2016 - 2:35... | 148:08 HR |
| SALES | JAMES | SALES CONSULTING | 11 OCT. 2016 - 6:19... | 07:15 MIN |
| SUPPORT | MEL | SALES CONSULTING | 11 OCT. 2016 - 5:00... | 13:05 MIN |

FIG. 8B

SMART CAPACITY FOR WORKLOAD ROUTING

CROSS-REFERENCE TO RELATED APPLICATIONS

The present application claims the priority benefit of U.S. Provisional Patent Application No. 62/838,522, filed on Apr. 25, 2019, the disclosures of which is hereby incorporated by reference in its entirety for all purposes.

FIELD

The present disclosure relates generally to facilitating routing of communications. More ally, techniques are provided to route requests to appropriate resources with sufficient capacity in a network, with modeled load capacity and capacity routing.

BACKGROUND

Many communication systems focus on routing requests appropriately to available resources in a system. For networks that connect individual users to agent resources, teams of individuals, each of which may be assigned different roles and tasks based on their respective ability and capacity can be connected via workload routing. Contact center operations occur by manual means with routing performed by human operators to connect users with appropriate agents. Such agents may be trained to answer questions and provide answers and basic services on behalf of a brand. Such communications may not occur in-person or even on the telephone, but rather by electronic means, such as email, text, online applications, and messaging applications. For a given system, such agents may be trained to address a variety of commonly asked questions and issues. Each conversation may vary, however, in terms of difficulty, complexity, number of issues, and user actions.

To maximize agent efficiency, routing systems can be used with each agent to assigned to handle multiple user connections (e.g. conversations or communication streams) simultaneously. Presently available systems may identify a predetermined number of slots for each agent and evaluate the capacity of each agent based on an extent to which the predetermined number of slots has been filled. Such systems that rely on set numbers of slots and/or quotas lack the ability to distinguish different levels of complexity or difficulty. As such, two agents may be identified as having a similar level of capacity, but one of those agents may actually be dealing with a more complex conversation requiring more time and in-depth analysis. At best, some systems may add or subtract a predetermined slot fraction to conversations flagged as especially simple or especially difficult. Such predetermined slot fractions cannot, however, identify the predicted workload with any more precision and remain unable to distinguish between different levels of difficulty.

Evaluating conversations so as to ascertain a predicted workload (e.g., in terms of time and engagement level) may be complicated, however, as no conversation is conducted alike. Different individuals of different backgrounds use language differently, and there is, therefore no standardized way to evaluate their respective conversations.

SUMMARY

The term example and like terms are intended to refer broadly to all of the subject matter of this disclosure and the claims below. Statements containing these terms should be understood not to limit the subject matter described herein or to limit the meaning or scope of the claims below. Examples of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entirety of this disclosure, any or all drawings and each claim.

Examples described herein provide for intelligence-driven routing of communication to available workload capacity. Systems and methods for intelligence-driven routing of workload capacity may include storing a workload model in memory regarding a set of different factors associated with user communications. The workload model can then be used to route the workload of agents responding to requests by users for communications. The workload capacity routing can consider different factors to route new requests among agents, and to distribute and monitor capacity of agents engaged with the system responsive to data being received and processed in the system without delays other than communication, processing, or other such resource delays. Each factor may be associated with a measurement of workload. An incoming request for a user communication may be received. Such received request may include information regarding one or more of the factors. A workload measurement may be identified for the requested user communication based on comparing the received request information to the stored workload model. An agent may then be identified as being available to handle the identified workload measurement based on as having a current workload capacity to handle the identified workload measurement. A communication slot defined by the identified workload measurement may be activated for the identified agent. The incoming request may be routed to the identified agent, and a current workload capacity of the identified agent may be dynamically updated based on the identified workload measurement.

Examples described herein improve the performance of a communication system and devices within the system such as agent devices by efficiently distributing communications among the devices in the system. For example, communication distribution within such a user communication system may not follow normal patterns, and can include communication intensities that are not obvious strictly from the volume of data in a system. Smart analysis of workload can identify patterns of user communication intensity using different factors to predict and identify resource load patterns before capacity issues occur, and route and distribute workload within such a system to avoid capacity issues (e.g., certain agents being overwhelmed or overloaded by a sudden shift in communication intensity while other agents have significant extra capacity).

Workload models may associate the respective user component and agent component in association with a set of different factors. Each factor may indicative of a measurement of workload defined in a manner to the industry or system type. In a call center, for example, workload may be defined in terms of a standard unit (e.g., call slot) or in terms of percentage. Whereas prior implementations of call center systems may automatically route calls to agents each tasked with handling a predefined number of slots, the present examples can dynamically assign a number of slots to each agent and activate slots for an agent as needed. Such aspects improve the operation of communication systems, networks, and individual devices in the system by optimizing the use of processing and network resources, and therefore improving throughput of the system and avoiding system imbalance and imbalanced use of computing resources which degrade performance.

BRIEF DESCRIPTION OF THE DRAWINGS

The present disclosure is described in conjunction with the appended figures:

FIG. 8B illustrates aspects of a dashboard interface implementation that includes information regarding multiple user communications that can be used for smart capacity workflow routing in accordance with examples described herein;

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides examples of example(s) only and is not intended to limit the scope, applicability or configuration of the disclosure. Rather, the ensuing description of the examples of example(s) will provide those skilled in the art with an enabling description for implementing examples of example. It is understood that various changes can be made in the function and arrangement of elements without departing from the spirit and scope as set forth in the appended claims.

As described above, examples include systems, methods, instructions, and other implementations for workload routing using smart capacity. Elements of such examples analyze factors present in user requests for communication on various communication channels. Agents available in a system to respond to such requests are associated with various factors and a current workload capacity. A workload can be assigned or measured based on factors associated with an incoming request, and this measured workload assessed against the available workload capacity of agents in the system to select and route a request to a particular agent. The use of factors from the request as described herein with a workload model to match a workload measurement for a new communication with agent capacity improves network communications and the operations of devices in such a network by efficiently using processing and communication resources, and balancing capacity to prevent parts of a system from being overwhelmed by high intensity communications with users that are not expected. When compared with a system that simply distributes user connections evenly by the number of connections, fewer capacity bottlenecks and performance issues due to parts of a system being overwhelmed will occur. Instead, the described workload models and smart capacity routes new connections in response to user requests based on workload models to improve network efficiency and avoid performance and quality issues that can occur with parts of a system being overwhelmed.

Figure 1:
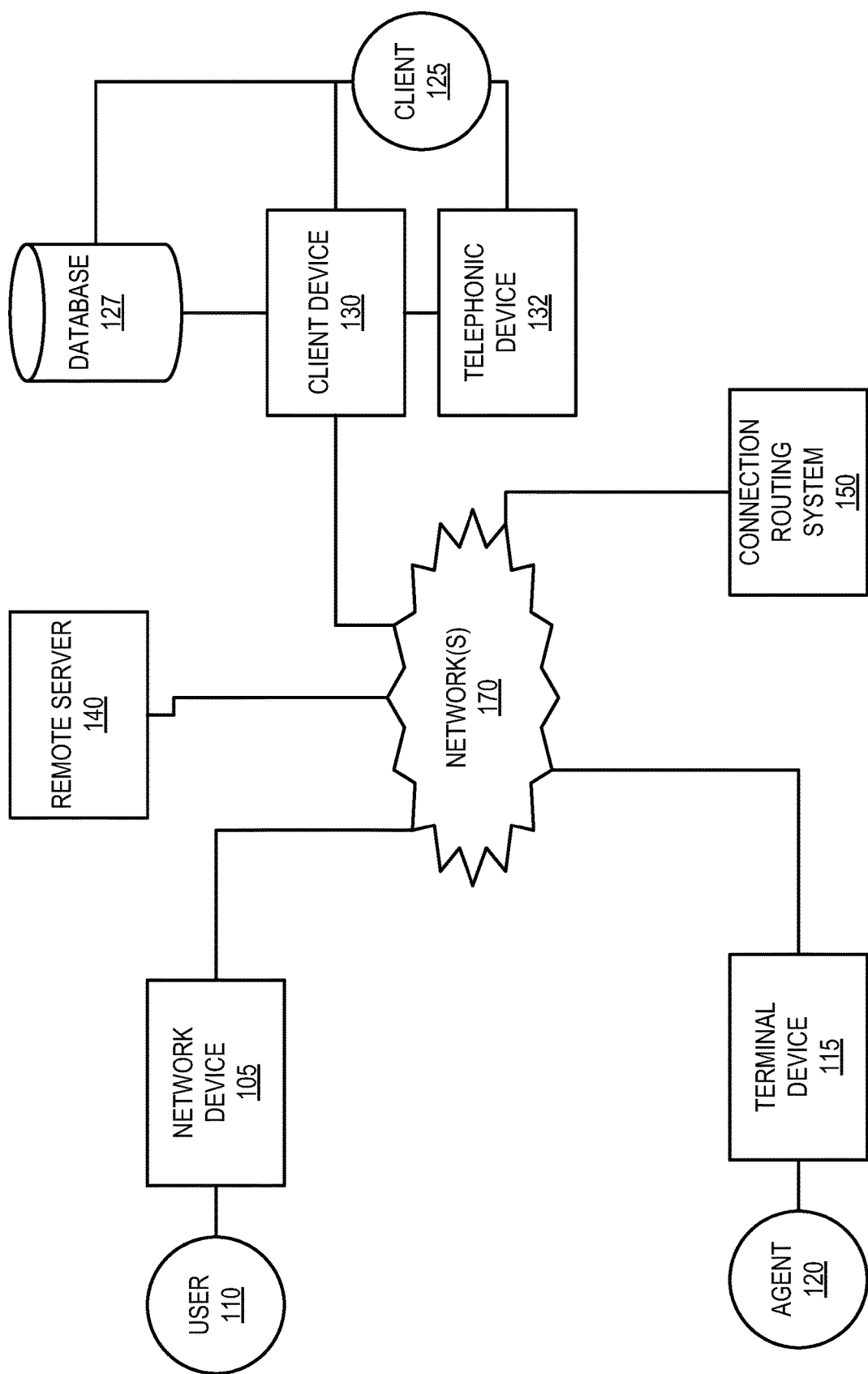
FIG. 1 shows a block diagram of an example of a network system for use with examples described herein.

FIG. 1 shows a block diagram of an example of a network communication system which implements and supports certain examples and features described herein for workload routing. Certain examples relate to establishing a connection channel between a network device 105 (which can be operated by a user 110) and a client device 130 associated with a client 125. In certain examples, the network communication system can include a terminal device 115 (which can be operated by an agent 120). In such a system, a connection routing system 150 can store a network model and route incoming requests for user communication from user(s) 110 in order to efficiently route such requests to agent(s) 120 in the system via networks 170

In certain examples, a user 110 can be an individual attempting to contact a client 125 via telephonic device 132. A client 125 can be an entity that provides, operates, or runs a service, or individuals employed by or assigned by such an entity to perform the tasks available to a client 125 as described herein. The agent 120 can be an individual, such as a support agent tasked with providing support or information to the user 110 regarding the service. Out of a large number of agents, a subset of agents may be appropriate for providing support or information for a particular client 125. The agent 120 may be affiliated or not affiliated with the client 125. Each agent can be associated with one or more clients 125. In some non-limiting examples, a user 110 can be an individual attempting to book an appointment via a cell phone, a client 125 can be a company that provides medical services, and an agent 120 can be a representative employed by the company. In various examples, the user 110, client 125, and agent 120 can be other individuals or entities.

While FIG. 1 shows only a single network device 105, terminal device 115 and client device 130 coupled to a database 127, a communication system can include multiple or many (e.g., tens, hundreds or thousands) of each of one or more of these types of devices. In various implementations, different nodes of a communication system can include repeated copies of client device 130, telephonic device 132, and other devices coupled to one or more shared database(s) 127 for client 125. Similarly, while FIG. 1 shows only a single user 110, agent 120 and client 125, a communication system of FIG. 1 can include multiple or many of each of one or more of such entities. Thus, it may be necessary to determine which terminal device is to be selected to communicate with a given network device. Further complicating matters, a remote server 140 may also be configured to receive and respond to select network-device communications.

A connection routing system 150 can facilitate strategic routing of communications. A communication can include a message with content (e.g., defined based on input from an entity, such as typed or spoken input). The communication can also include additional data, such as data about a transmitting device (e.g., an IP address, account identifier, device type and/or operating system); a destination address; an identifier of a client; an identifier of a webpage or webpage element (e.g., a webpage or webpage element being visited when the communication was generated or otherwise associated with the communication) or online history data; a time (e.g., time of day and/or date); and/or destination address. Other information can be included in the communication. In some instances, connection routing system 150 routes the entire communication to another device. In some instances, connection routing system 150 modifies the communication or generates a new communication (e.g., based on the initial communication). The new or modified communication can include the message (or processed version thereof), at least some (or all) of the additional data (e.g., about the transmitting device, webpage or online history and/or time) and/or other data identified by connection routing system 150 (e.g., account data associated with a particular account identifier or device). The new or modified communication can include other information as well.

Part of strategic-routing facilitation can include establishing, updating and using one or more connection channels between network device 105 and one or more terminal devices 115. For example, upon receiving a communication from network device 105, connection routing system 150 can first estimate to which client (if any) the communication corresponds. Upon identifying a client, connection routing system 150 can identify a terminal device 115 associated with the client for communication with network device 105. In some instances, the identification can include evaluating a profile of each of a plurality of agents (or experts or delegates), each agent (e.g., agent 120) in the plurality of agents being associated with a terminal device (e.g., terminal device 115). The evaluation can relate to a content in a network-device message.

In some instances, connection routing system 150 can determine whether any connection channels are established between network device 105 and a terminal device associated with the client (or remote server 140) and, if so, whether such channel is to be used to exchange a series of communications including the communication.

Upon selecting a terminal device 115 to communicate with network device 105, connection routing system 150 can establish a connection channel between the network device 105 and terminal device 115. In some instances, connection routing system 150 can transmit a message to the selected terminal device 115. The message may request an acceptance of a proposed assignment to communicate with a network device 105 or identify that such an assignment has been generated. The message can include information about network device 105 (e.g., IP address, device type, and/or operating system), information about an associated user 110 (e.g., language spoken, duration of having interacted with client, skill level, sentiment, and/or topic preferences), a received communication, code (e.g., a clickable hyperlink) for generating and transmitting a communication to the network device 105, and/or an instruction to generate and transmit a communication to network device 105.

In one instance, communications between network device 105 and terminal device 115 can be routed through connection routing system 150. Such a configuration can allow connection routing system 150 to monitor the communication exchange and to detect issues (e.g., as defined based on rules) such as non-responsiveness of either device or extended latency. Further, such a configuration can facilitate selective or complete storage of communications, which may later be used, for example, to assess a quality of a communication exchange and/or to support learning to update or generate routing rules so as to promote particular post-communication targets.

In some examples, connection routing system 150 can monitor the communication exchange in perform automated actions (e.g., rule-based actions) based on the live communications. For example, when connection routing system 150 determines that a communication relates to a particular item (e.g., product), connection routing system 150 can automatically transmit an additional message to terminal device 115 containing additional information about the item (e.g., quantity of item available, links to support documents related to the item, or other information about the item or similar items).

In one instance, a designated terminal device 115 ca communicate with network device 105 without relaying communications through connection routing system 150. One or both devices 105, 115 may (or may not) report particular communication metrics or content to connection routing system 150 to facilitate communication monitoring and/or data storage.

As mentioned, connection routing system 150 may route select communications to a remote server 140. Remote server 140 can be configured to provide information in a predetermined manner. For example, remote server 140 may access defined one or more text passages, voice recording and/or files to transmit in response to a communication. Remote server 140 may select a particular text passage, recording or file based on, for example, an analysis of a received communication (e.g., a semantic or mapping analysis).

Routing and/or other determinations or processing performed at connection routing system 150 can be performed based on rules and/or data at least partly defined by or provided by one or more client devices 130. For example, client device 130 may transmit a communication that identifies a prioritization of agents, terminal-device types, and/or topic/skill matching. As another example, client device 130 may identify one or more weights to apply to various variables potentially impacting routing determinations (e.g., language compatibility, predicted response time, device type and capabilities, and/or terminal-device load balancing). It will be appreciated that which terminal devices and/or agents are to be associated with a client may be dynamic. Communications from client device 130 and/or terminal devices 115 may provide information indicating that a given terminal device and/or agent is to be added or removed as one associated with a client. For example, client device 130 can transmit a communication with IP address and an indication as to whether a terminal device with the address is to be added or removed from a list identifying client-associated terminal devices.

Each communication (e.g., between devices, between a device and connection routing system 150, between remote server 140 and connection routing system 150 or between remote server 140 and a device) can occur over one or more networks 170. Any combination of open or closed networks can be included in the one or more networks 170. Examples of suitable networks include the Internet, a personal area network, a local area network (LAN), a wide area network (WAN), or a wireless local area network (WLAN). Other networks may be suitable as well. The one or more networks 170 can be incorporated entirely within or can include an intranet, an extranet, or a combination thereof. In some instances, a network in the one or more networks 170 includes a short-range communication channel, such as a Bluetooth or a Bluetooth Low Energy channel. In one example, communications between two or more systems and/or devices can be achieved by a secure communications protocol, such as secure sockets layer (SSL) or transport layer security (TLS). In addition, data and/or transactional details may be encrypted based on any convenient, known, or to be developed manner, such as, but not limited to, Data Encryption Standard (DES), Triple DES, Rivest-Shamir-Adleman encryption (RSA), Blowfish encryption, Advanced Encryption Standard (AES), CAST-128, CAST-256, Decorrelated Fast Cipher (DFC), Tiny Encryption Algorithm (TEA), eXtended TEA (XTEA), Corrected Block TEA (XX-TEA), and/or RCS, etc.

A network device 105, terminal device 115 and/or client device 130 can include, for example, a portable electronic device (e.g., a smart phone, tablet, laptop computer, or smart wearable device) or a non-portable electronic device (e.g., one or more desktop computers, smart appliances, servers, and/or processors). Connection routing system 150 can be separately housed from network, terminal and client devices or may be part of one or more such devices (e.g., via installation of an application on a device). Remote server 140 may be separately housed from each device and connection routing system 150 and/or may be part of another device or system. While each device, server and system in FIG. 1 is shown as a single device, it will be appreciated that multiple devices may instead be used. For example, a set of network devices can be used to transmit various communications from a single user, or remote server 140 may include a server stack.

A software agent or application may be installed on and/or executable on a depicted device, system or server. In one instance, the software agent or application is configured such that various depicted elements can act in complementary manners. For example, a software agent on a device can be configured to collect and transmit data about device usage to a separate connection routing system, and a software application on the separate connection routing system can be configured to receive and process the data.

Figure 2:
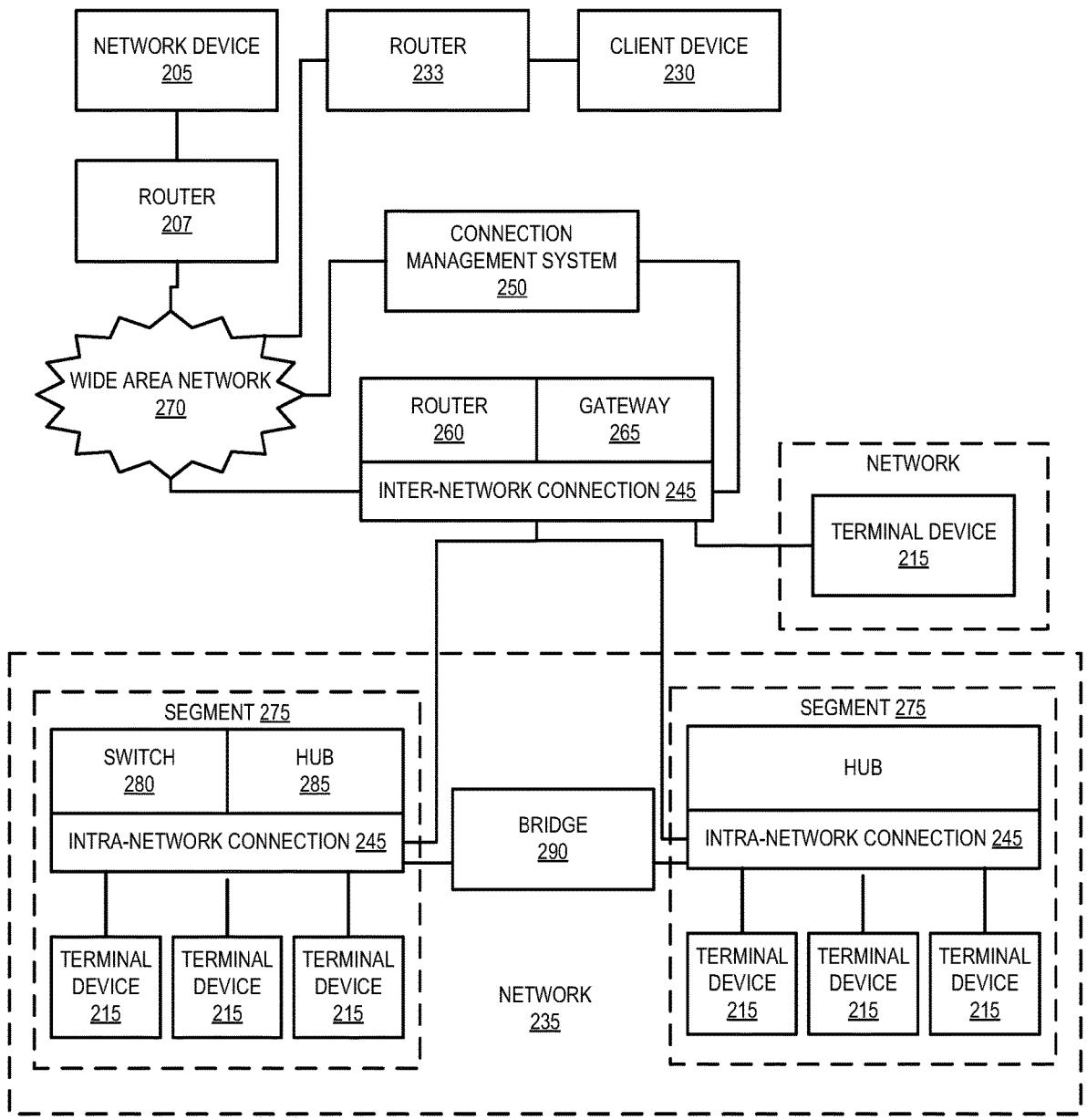
FIG. 2 shows a block diagram of another example of a network system for use with examples described herein.

FIG. 2 shows a block diagram of another example of a network communication system. Generally, FIG. 2 illustrates a variety of components configured and arranged to enable a network device 205 to communicate with one or more terminal devices 215 via network connections such as router 207 and wide area network 270. The depicted instance includes nine terminal devices 215 included in three local-area networks 235.

In some instances, a communication from network device 205 includes destination data (e.g., a destination IP address) that at least partly or entirely indicates which terminal device is to receive the communication. A network communication system such as the system described in FIG. 2 can include one or more inter-network connection components 245 that can process the destination data and facilitate appropriate routing.

Each inter-network connection components 245 can be connected to a plurality of networks 235 and can have multiple network cards installed (e.g., each card connected to a different network). For example, an inter-network connection component 245 can be connected to a wide-area network 270 (e.g., the Internet) and one or more local-area networks 235. In the depicted instance, in order for a communication to be transmitted from network device 205 to any of the terminal devices, in the depicted system, the communication is handled by multiple inter-network connection components 245. Similarly, communications with client device 230 via router 233 are also handled by inter-network connection components 245.

When an inter-network connection component 245 receives a communication (or a set of packets corresponding to the communication), inter-network connection component 245 can determine at least part of a route to pass the communication to a network associated with a destination. The route can be determined using, for example, a routing table (e.g., stored at the router), which can include one or more routes that are pre-defined, generated based on an incoming message (e.g., from another router or from another device) or learned.

Examples of inter-network connection components 245 include a router 260 and a gateway 265. An inter-network connection component 245 (e.g., gateway 265) may be configured to convert between network systems or protocols. For example, gateway 265 may facilitate communication between Transmission Control Protocol/Internet Protocol (TCP/IP) and Internetwork Packet Exchange/Sequenced Packet Exchange (IPX/SPX) devices.

Upon receiving a communication at a local-area network 235, further routing may still be performed. Such intra-network routing can be performed via an intra-network connection component 245, such as a switch 280 or hub 285. Each intra-network connection component 245 can be connected to (e.g., wirelessly or wired, such as via an Ethernet cable) multiple terminal devices 215. Hub 285 can be configured to repeat all received communications to each device to which it is connected. Each terminal device can then evaluate each communication to determine whether the terminal device is the destination device or whether the communication is to be ignored. Switch 280 can be configured to selectively direct communications to only the destination terminal device.

In some instances, a local-area network 235 can be divided into multiple segments, each of which can be associated with independent firewalls, security rules and network protocols. An intra-network connection component 245 can be provided in each of one, more or all segments to facilitate intra-segment routing. A bridge 290 can be configured to route communications across segments 275.

To appropriately route communications across or within networks, various components analyze destination data in the communications. For example, such data can indicate which network a communication is to be routed to, which device within a network a communication is to be routed to or which communications a terminal device is to process (versus ignore). However, in some instances, it is not immediately apparent which terminal device (or even which network) is to participate in a communication from a network device.

To illustrate, a set of terminal devices may be configured so as to provide similar types of responsive communications. Thus, it may be expected that a query in a communication from a network device may be responded to in similar manners regardless to which network device the communication is routed. While this assumption may be true at a high level, various details pertaining to terminal devices can give rise to particular routings being advantageous as compared to others. For example, terminal devices in the set may differ from each other with respect to (for example) which communication channels are supported, geographic and/or network proximity to a network device and/or characteristics of associated agents (e.g., knowledge bases, experience, languages spoken, capacity, general personality or sentiment, etc.). Accordingly, select routings may facilitate faster responses that more accurately and/or completely respond to a network-device communication. A complication is that static routings mapping network devices to terminal devices may fail to account for variations in communication topics, channel types, agent capacity, and so on.

In FIG. 2, connection routing system 250 can be configured to serve as a relay and/or destination address. Thus, for example, a set of network devices 205 may transmit communications, each identifying connection routing system 250 as a destination. Connection routing system 250 can receive each communication and can concurrently monitor a set of terminal devices (e.g., so as to generate metrics for each terminal device). Based on the monitoring and a rule, connection routing system 250 can identify a terminal device 215 to which it may relay each communication. Depending on the example, terminal device communications may similarly be directed to a consistent destination (e.g., of connection routing system 250) for further relaying, or terminal devices may begin communicating directly with corresponding network devices. These examples can facilitate efficient routing and thorough communication monitoring.

It will be appreciated that many variations of FIG. 2 are contemplated. For example, connection routing system 250 may be associated with a connection component (e.g., inter-network connection component 245 or intra-network connection component 245) such that an application corresponding to connection routing system 250 (or part thereof) is installed on the component. The application may, for example, perform independently or by communicating with one or more similar or complementary applications (e.g., executing on one or more other components, network devices or remotes servers).

Figure 3:
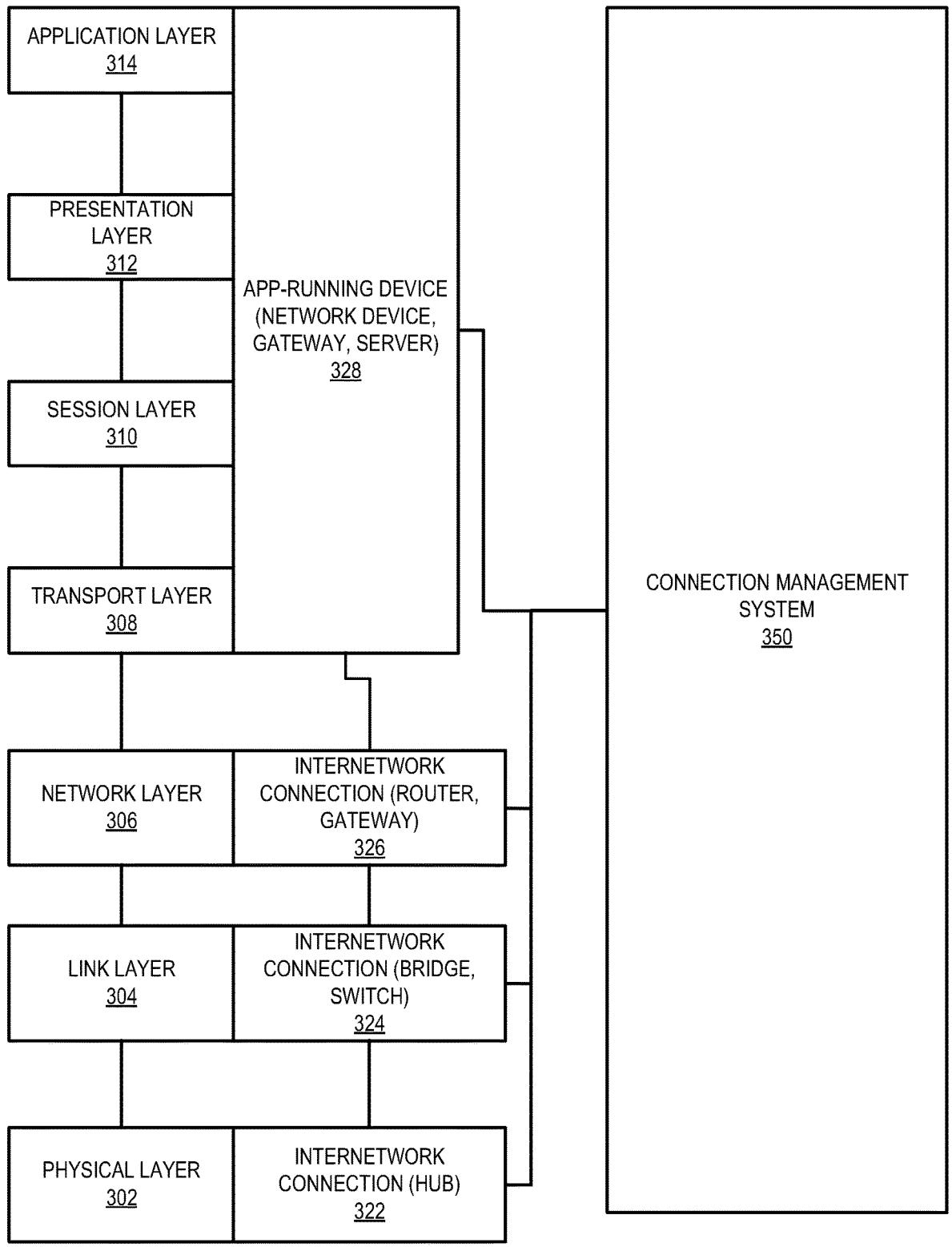
FIG. 3 shows a representation of a protocol-stack mapping of connection components for use with examples described herein.

FIG. 3 shows a representation of a protocol-stack mapping of connection components' operation. More ally, FIG. 3 identifies a layer of operation in an Open Systems Communication (OSI) model that corresponds to various connection components.

The OSI model can include multiple logical layers 302-314. The layers are arranged in an ordered stack, such that layers 302-312 each serve a higher level and layers 304-314 is each served by a lower layer. The OSI model includes a physical layer 302. Physical layer 302 can define parameters physical communication (e.g., electrical, optical, or electromagnetic). Physical layer 302 also defines connection routing protocols, such as protocols to establish and close connections. Physical layer 302 can further define a flow-control protocol and a transmission mode.

A link layer 304 can route node-to-node communications. Link layer 304 can detect and correct errors (e.g., transmission errors in the physical layer 302) and control access permissions. Link layer 304 can include a media access control (MAC) layer and logical link control (LLC) layer.

A network layer 306 can coordinate transferring data (e.g., of variable length) across nodes in a same network (e.g., as datagrams). Network layer 306 can convert a logical network address to a physical machine address.

A transport layer 308 can control transmission and receipt quality. Transport layer 308 can provide a protocol for transferring data, such as a Transmission Control Protocol (TCP). Transport layer 308 can perform segmentation/de-segmentation of data packets for transmission and can detect and account for transmission errors occurring in layers 302-306. A session layer 310 can initiate, maintain and terminate connections between local and remote applications. Sessions may be used as part of remote-procedure communications. A presentation layer 312 can encrypt, decrypt and format data based on data types known to be accepted by an application or network layer.

An application layer 314 can interact with software applications that control or control communications. Via such applications, application layer 314 can (for example) identify destinations, local resource states or capacity and/or communication content or formatting. Various layers 302-314 can perform other functions as available and applicable.

Intra-network connection components 322, 324 are shown to operate in physical layer 302 and link layer 304. More ally, a hub can operate in the physical layer, such that operations can be controlled with respect to receipts and transmissions of communications. Because hubs lack the ability to address communications or filter data, they possess little to no capability to operate in higher levels. Switches, meanwhile, can operate in a link layer, as they are capable of filtering communication frames based on addresses (e.g., MAC addresses).

Meanwhile, inter-network connection components 326, 328 are shown to operate on higher levels (e.g., layers 306-314). For example, routers can filter communication data packets based on addresses (e.g., IP addresses). Routers can forward packets to particular ports based on the address, so as to direct the packets to an appropriate network. Gateways can operate at the network layer and above, perform similar filtering and directing and further translation of data (e.g., across protocols or architectures).

A connection routing system 350 can interact with and/or operate on, in various examples, one, more, all or any of the various layers. For example, connection routing system 350 can interact with a hub so as to dynamically adjust which terminal devices or client devices the hub communicates. As another example, connection routing system 350 ca communicate with a bridge, switch, router or gateway so as to influence which terminal device the component selects as a destination (e.g., MAC, logical or physical) address. By way of further examples, a connection routing system 350 can monitor, control, or direct segmentation of data packets on transport layer 308, session duration on session layer 310, and/or encryption and/or compression on presentation layer 312. In some examples, connection routing system 350 can interact with various layers by exchanging communications with (e.g., sending commands to) equipment operating on a particular layer (e.g., a switch operating on link layer 304), by routing or modifying existing communications (e.g., between a network device and a client device) in a particular manner, and/or by generating new communications containing particular information (e.g., new destination addresses) based on the existing communication. Thus, connection routing system 350 can influence communication routing and channel establishment (or maintenance or termination) via communication with a variety of devices and/or via influencing operating at a variety of protocol-stack layers.

Figure 4:
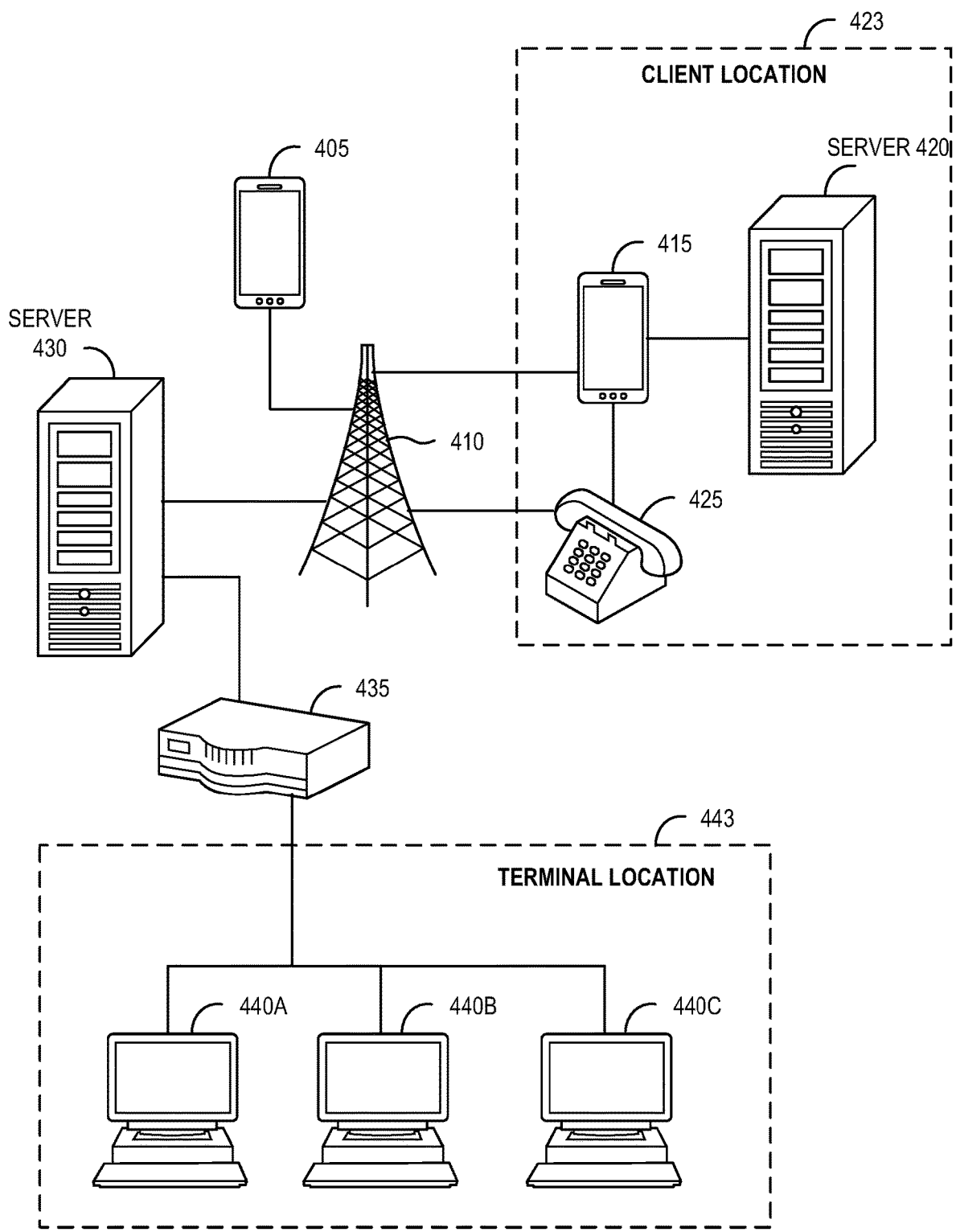
FIG. 4 shows a representation of a multi-device communication exchange system for use with some examples described herein.

FIG. 4 represents a multi-device communication exchange system according to an example. The system includes a network device 405 configured to communicate with a variety of types of terminal devices and client devices over a variety of types of communication channels.

In the depicted instance, network device 405 can transmit a telephonic or text message communication over a cellular network (e.g., via a base station 410). The communication can be routed to a client location 423 or a terminal location 443. A connection routing system 430 receives the communication and identifies which client device or terminal device is to respond to the communication. Such determination can depend on identifying a client to which that communication pertains (e.g., based on a content analysis or user input indicative of the client) and determining one or more metrics for each of one or more terminal devices associated with the client. For example, in FIG. 4, each cluster of terminal devices 440A, 440B, and 440C can correspond to a different client or to different nodes for a particular client (e.g., nodes focused on different topics, response types, or associated with a particular routing path or parts of a routing path). The terminal devices may be geographically co-located or disperse. The metrics may be determined based on stored or learned data and/or monitoring as events occur (e.g., based on capacity).

Connection routing system 430 ca communicate with various terminal devices and client devices and other components via one or more routers 435 or other inter-network or intra-network connection components. Connection routing system 430 may collect, analyze and/or store data from or pertaining to communications, terminal-device operations, client rules, and/or user-associated actions (e.g., online activity) at one or more data stores. Such data may influence communication routing.

For example, machine learning models can use previous data and results of routing from prior operations to improve selection of future routing. This improvement can be achieved in workload models generated or updated with any combination of supervised learning with constructed data sets and historical data, unsupervised learning based on expectation or projection models for current routing paths in a system and system use targets, Any such data can be used in operations for natural language processing (e.g., natural language understanding, natural language inference, etc.) to generate natural language data or to update machine learning models. Such data can then be used by the client systems or shared with applications running on a network device or on a server to improve dynamic message processing (e.g., improved intent indicator data results or response message generation).

Client device 415 may also be connected to a telephonic device 425 associated with a client location. The telephonic device 425 may be a landline phone associated with a telephone number in some examples. Network device 405 may have the capability to generate and transmit a text (e.g., SMS) message to the telephone number associated with the telephonic device 425, which may be routed to the client device 415 in some examples. The client device 415 may be capable of receiving and processing text messages. In order to process received text messages from network device 405, client device 415 may be coupled to a server 420. Server 420 may receive and respond to inquiries from client device 415 for information regarding the goods or services provided at the client location 423, such as product information, an appointment schedule, hours of operation, location information, contact information, and the like.

Figure 5:
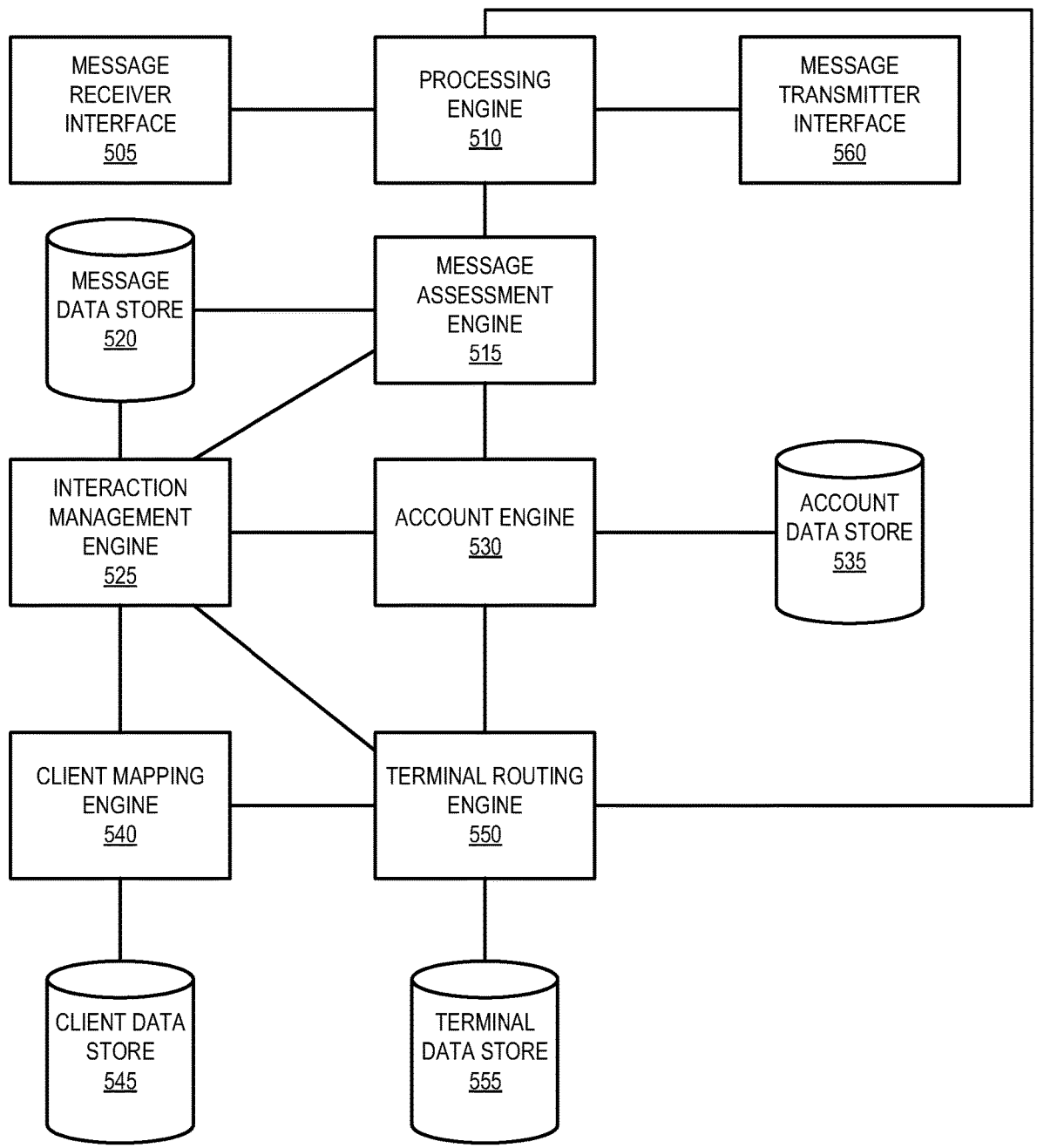
FIG. 5 represents a block diagram of a connection routing system for use with examples described herein.

FIG. 5 shows a block diagram of an example of a connection routing system. A message receiver interface 505 can receive a message. In some instances, the message can be received, for example, as part of a communication transmitted by a source device (e.g., housed separately from connection routing system or within a same housing), such as a network device. In some instances, the communication can be part of a series of communications or a communicate exchange, which can include a series of messages or message exchange being routed between two devices (e.g., a network device and a client device). This message or communication exchange may be part of and/or may define a communication between the devices. A communication channel or operative channel can include one or more protocols (e.g., routing protocols, task-assigning protocols and/or addressing protocols) used to facilitate routing and a communication exchange between the devices.

In some instances, the message can include a message generated based on inputs received at a local or remote user interface. For example, the message can include a message that was generated based on button or key presses or recorded speech signals. In one instance, the message includes an automatically generated message, such as one generated upon detecting that a network device has provided a particular input command (e.g., key sequence). The message can include an instruction or request, such as one to initiate a communication exchange.

In some instances, the message can include or be associated with an identifier of a client. For example, the message can explicitly identify the client (or a device associated with the client); the message can include or be associated with a webpage or app page associated with the client; the message can include or be associated with a destination address associated with a client; or the message can include or be associated with an identification of an item (e.g., product) or service associated with the client. To illustrate, a network device may be presenting an app page of a particular client, which may offer an option to transmit a communication to an agent. Upon receiving user input corresponding to a message, a communication may be generated to include the message and an identifier of the particular client (e.g., a text message to a phone number).

A processing engine 510 may process a received communication and/or message. Processing can include, for example, extracting one or more particular data elements (e.g., a message, a client identifier, a network-device identifier, an account identifier, and so on). Processing can include transforming a formatting or communication type (e.g., to be compatible with a particular device type, operating system, communication-channel type, protocol and/or network).

A message assessment engine 515 may assess the (e.g., extracted or received) message. The assessment can include identifying, for example, one or more categories or tags for the message. Examples of category or tag types can include (for example) topic, sentiment, complexity, and urgency. A difference between categorizing and tagging a message can be that categories can be limited (e.g., according to a predefined set of category options), while tags can be open. A topic can include, for example, a technical issue, a use question, or a request. A category or tag can be determined, for example, based on a semantic analysis of a message (e.g., by identifying keywords, sentence structures, repeated words, punctuation characters and/or non-article words); user input (e.g., having selected one or more categories); and/or message-associated statistics (e.g., typing speed and/or response latency).

In some instances, message assessment engine 515 can determine a metric for a message or a set of factors determined in association with a workload model used to assess and route a request received by a system. A metric can include, for example, a number of characters, words, capital letters, all-capital words or instances of particular characters or punctuation marks (e.g., exclamation points, question marks and/or periods). A metric can include a ratio, such as a fraction of sentences that end with an exclamation point (or question mark), a fraction of words that are all capitalized, and so on. A metric can include keywords or subject matter types that can be used to assign a set of factors to an expected user communication.

Message assessment engine 515 can store a message, message metric and/or message statistic in a message data store 520. Each message can also be stored in association with other data (e.g., metadata), such as data identifying a corresponding source device, destination device, network device, terminal device, client, one or more categories, one or more stages and/or message-associated statistics). Various components of the connection routing system (e.g., message assessment engine 515 and/or a communication routing engine 525) can query message data store 520 to retrieve query-responsive messages, message metrics and/or message statistics.

A communication routing engine 525 can determine to which device a communication is to be routed and how the receiving and transmitting devices are to communicate. Each of these determinations can depend, for example, on whether a particular network device (or any network device associated with a particular user) has previously communicated with a client device or terminal device in a set of terminal devices (e.g., any terminal device associated with the connection routing system or any terminal device associated with one or more particular clients). In some implementations, communication routing system implements an analysis of agent capacity by determining a workload measurement from the factors associated with a message, and comparing the workload measurement with the current workload capacity of individual agents, to assign and route a request for communication from a user to an agent.

In some instances, when a network device (or other network device associated with a same user or profile) has previously communicated with a given terminal device, communication routing can be generally biased towards the same terminal device. Other factors that may influence routing can include, for example, whether the terminal device (or corresponding agent) is available and/or a predicted response latency of the terminal device. Such factors may be considered absolutely or relative to similar metrics corresponding to other terminal devices. A re-routing rule (e.g., a client- or general rule) can indicate how such factors are to be assessed and weighted to determine whether to forego agent consistency.

When a network device (or other network device associated with a same user or account) has not previously communicated with a given terminal device, a terminal-device selection can be performed based on factors such as, for example, an extent to which various agents' knowledge base corresponds to a communication topic, capacity of various agents at a given time and/or over a channel type, types and/or capabilities of terminal devices (e.g., associated with the client). In one instance, a rule can identify how to determine a sub-parameter to one or more factors such as these and a weight to assign to each parameter. By combining (e.g., summing) weighted sub-parameters, a parameter for each agent can be determined. A terminal device selection can then be made by comparing terminal devices' parameters.

With regard to determining how devices are to communicate, communication routing engine 525 can (for example) determine whether a client device or terminal device is to respond to a communication via (for example) SMS message, voice call, video communication, etc. A communication type can be selected based on, for example, a communication-type priority list (e.g., at least partly defined by a client or user); a type of a communication previously received from the network device (e.g., so as to promote consistency), a complexity of a received message, capabilities of the network device, and/or an capacity of one or more terminal devices. Appreciably, some communication types will result in communication as events occur (e.g., where fast message response is expected), while others can result in asynchronous communication (e.g., where delays (e.g., of several minutes or hours) between messages are acceptable).

Communication routing engine 525 can interact with an account engine 530 in various contexts. For example, account engine 530 may look up an identifier of a network device or terminal device in an account data store 535 to identify an account corresponding to the device. Further, account engine 530 can maintain data about previous communication exchanges (e.g., times, involved other device(s), channel type, resolution stage, topic(s) and/or associated client identifier), connection channels (e.g., indicating—for each of one or more clients—whether any channels exist, a terminal device associated with each channel, an establishment time, a usage frequency, a date of last use, any channel constraints and/or supported types of communication), user or agent preferences or constraints (e.g., related to terminal-device selection, response latency, terminal-device consistency, agent expertise, and/or communication-type preference or constraint), and/or user or agent characteristics (e.g., age, language(s) spoken or preferred, geographical location, interests, and so on).

Further, communication routing engine 525 can alert account engine 530 of various connection-channel actions, such that account data store 535 can be updated to reflect the current channel data. For example, upon establishing a channel, communication routing engine 525 can notify account engine 530 of the establishment and identify one or more of: a network device, a terminal device, an account and a client. Account engine 530 can (in some instances) subsequently notify a user of the channel's existence such that the user can be aware of the agent consistency being availed.

Communication routing engine 525 can further interact with a client mapping engine 540, which can map a communication to one or more clients (and/or associated brands). In some instances, a communication received from a network device itself includes an identifier corresponding to a client (e.g., an identifier of a client, webpage, or app page). The identifier can be included as part of a message (e.g., which client mapping engine 540 may detect) or included as other data in a message-inclusive communication. Client mapping engine 540 may then look up the identifier in a client data store 545 to retrieve additional data about the client and/or an identifier of the client.

In some instances, a message may not particularly correspond to any client. For example, a message may include a general query. Client mapping engine 540 may, for example, perform a semantic analysis on the message, identify one or more keywords and identify one or more clients associated with the keyword(s). In some instances, a single client is identified. In some instances, multiple clients are identified. An identification of each client may then be presented via a network device such that a user can select a client to communicate with (e.g., via an associated terminal device).

Client data store 545 can include identifications of one or more terminal devices (and/or agents) associated with the client. A terminal routing engine 550 can retrieve or collect data pertaining to each of one, more or all such terminal devices (and/or agents) so as to influence routing determinations. For example, terminal routing engine 550 may maintain a terminal data store, which can store information such as terminal devices' device types, operating system, communication-type capabilities, installed applications accessories, geographic location and/or identifiers (e.g., IP addresses). Some information can be dynamically updated. For example, information indicating whether a terminal device is available may be dynamically updated based on (for example) a communication from a terminal device (e.g., identifying whether the device is asleep, being turned off/on, non-active/active, or identifying whether input has been received within a time period); a communication routing (e.g., indicative of whether a terminal device is involved in or being assigned to be part of a communication exchange); or a communication from a network device or terminal device indicating that a communication exchange has ended or begun.

It will be appreciated that, in various contexts, being engaged in one or more communication exchanges does not necessarily indicate that a terminal device is not available to engage in another communication exchange. Various factors, such as communication types (e.g., message), client-identified or user-identified target response times, and/or system loads (e.g., generally or with respect to a user) may influence how many exchanges a terminal device may be involved in.

When communication routing engine 525 has identified a terminal device or client device to involve in a communication exchange or connection channel, it can notify terminal routing engine 550, which may retrieve any pertinent data about the terminal device from terminal data store 555, such as a destination (e.g., IP) address, device type, protocol, etc. Processing engine 510 can then (in some instances) modify the message-inclusive communication or generate a new communication (including the message) so as to have a particular format, comply with a particular protocol, and so on. In some instances, a new or modified message may include additional data, such as account data corresponding to a network device, a message chronicle, and/or client data.

A message transmitter interface 560 can then transmit the communication to the terminal device or client device. The transmission may include, for example, a wired or wireless transmission to a device housed in a separate housing. The terminal device can include a terminal device in a same or different network (e.g., local-area network) as the connection routing system. Accordingly, transmitting the communication to the terminal device can include transmitting the communication to an inter- or intra-network connection component.

Figure 6:
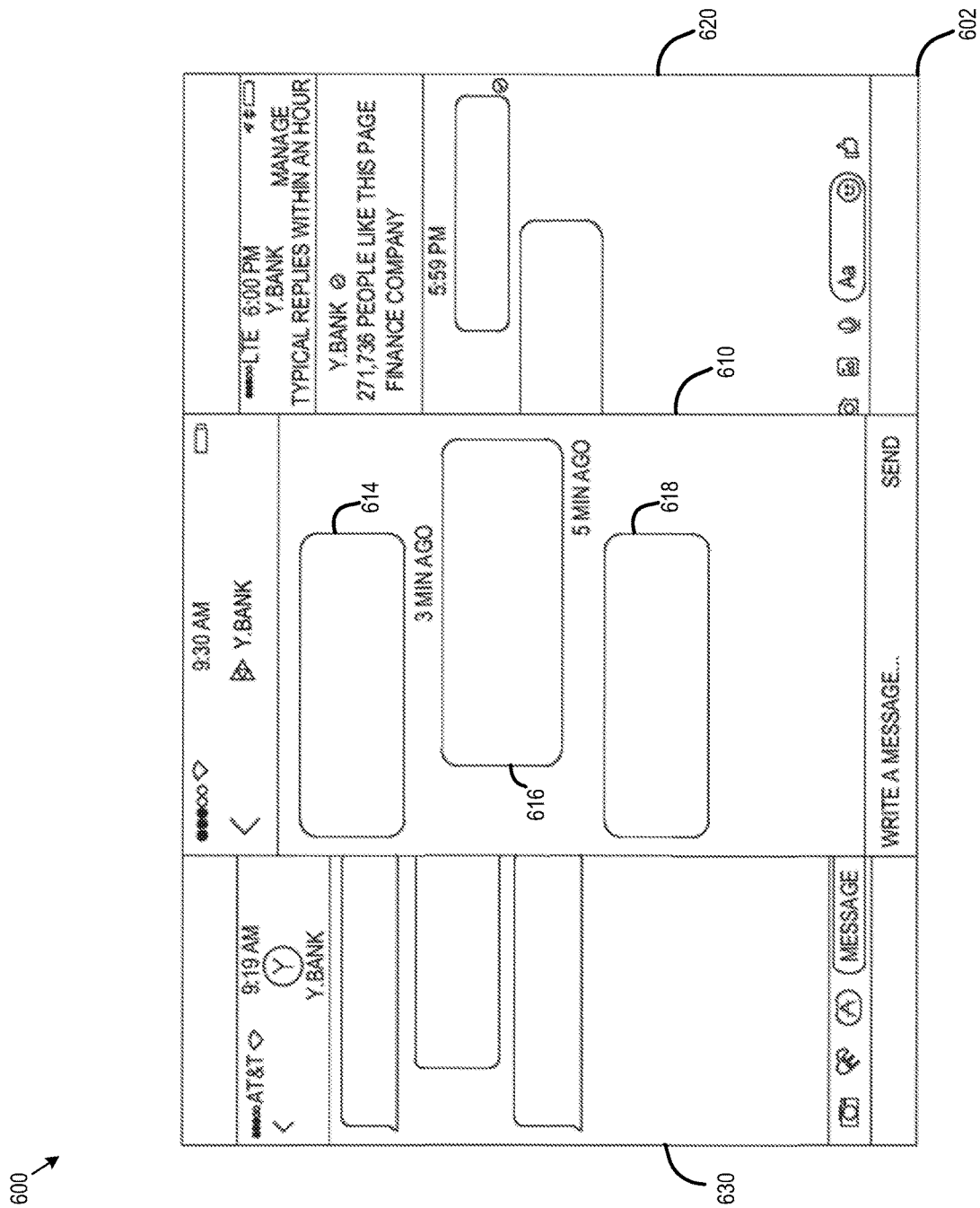
FIG. 6 illustrates an implementation of an agent workspace interface for an agent handling multiple user communications simultaneously that can be used with smart capacity workflow routing in accordance with examples described herein.

FIG. 6 illustrates an agent workspace 600 of an agent (e.g., agent 120) that is handling multiple user communications simultaneously. As described above, example systems can be used to receive incoming requests for a user communication from users. Such requests can be routed to agents operating in the communication system using workload balancing to improve operations of such a system. The illustrated agent workspace 600, which may be displayed in a screen area 602 of an agent device used by the agent, includes three windows 610, 620, and 630 that each correspond to a different conversation with a different user. As shown, a central window 610 includes an interface display of incoming communications 618 and 614, and outgoing communication 616. The right hand window 620 and the left hand window 630 each include similar interface displays of a history of communications between the agent associated with agent workspace 600, and a different user associated with each display. Each display will be generated in response to a request for user communication from an associated user that is routed to the agent associated with agent workspace 600. The agent can then use the windows to interact with and respond to information from users as part of a user communication. Such windows may correspond to different types of messaging platforms and application. In some implementations, different channels, including messaging channels, application based channels, web interface channels, and audio channels can be represented in different windows.

Notwithstanding, each user communication may be analyzed individually and in aggregate to identify a current aggregated workload for a particular agent. As illustrated in the windows, each communication may be associated with different topics and different issues, which may use different types and amounts of work in order to engage in the communication in a way that leads to high levels of user satisfaction.

Each type of system may deal with different types of user communications. The different types of user communications may involve different levels of workloads, however. For example, one of the illustrated windows includes an inquiry for general information regarding new savings accounts, while another one of the illustrated windows includes an inquiry regarding fees on an account of the user. The former is a general inquiry for which there is likely to be a standard set of responsive materials, while the latter involves looking up user-information. Looking up the user-information may involve follow-up questions to elicit the user identity and credentials, to verify user identity and credentials, to clarify the fees at issue, and to identify the question regarding such fees, and to investigate responsive answers to the same. An agent who is tasked with handling an instance (or even multiple instances) of the former type of question (e.g., involving providing generic information) may therefore be identified as handling a higher level of workload than another agent who is tasked with handling an instance of the latter type (e.g., involving more extensive engagement with the user to elicit certain answers and to derive a response).

Data from such communications can be stored in a system, and used for both historical analysis of workload, as well as smart analysis and routing of workloads for agents in a system.

Figure 7A:
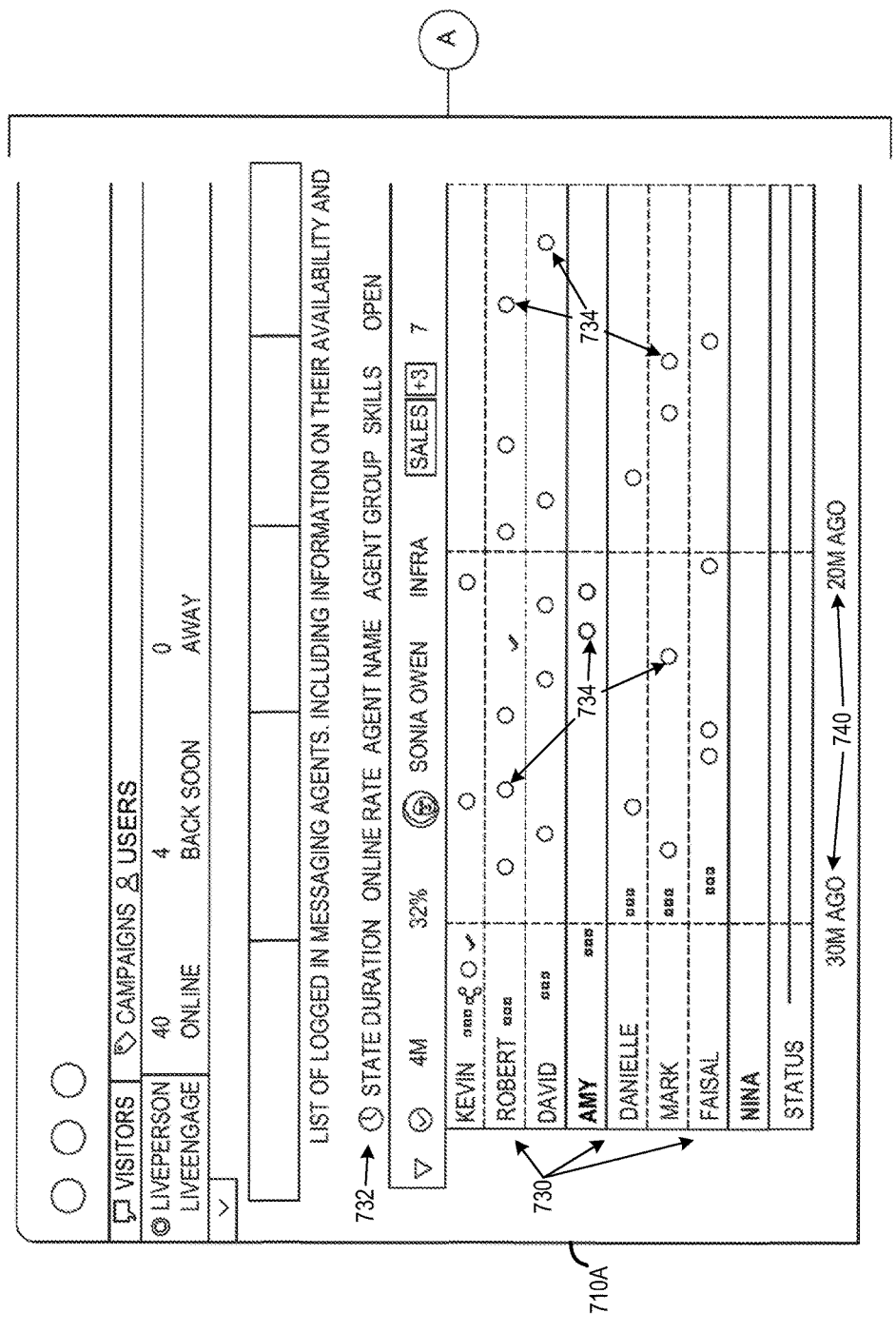
FIG. 7A illustrates aspects of a dashboard interface implementation that includes information regarding multiple agents that can be used for smart capacity workflow routing in accordance with examples described herein.
Figure 7B:
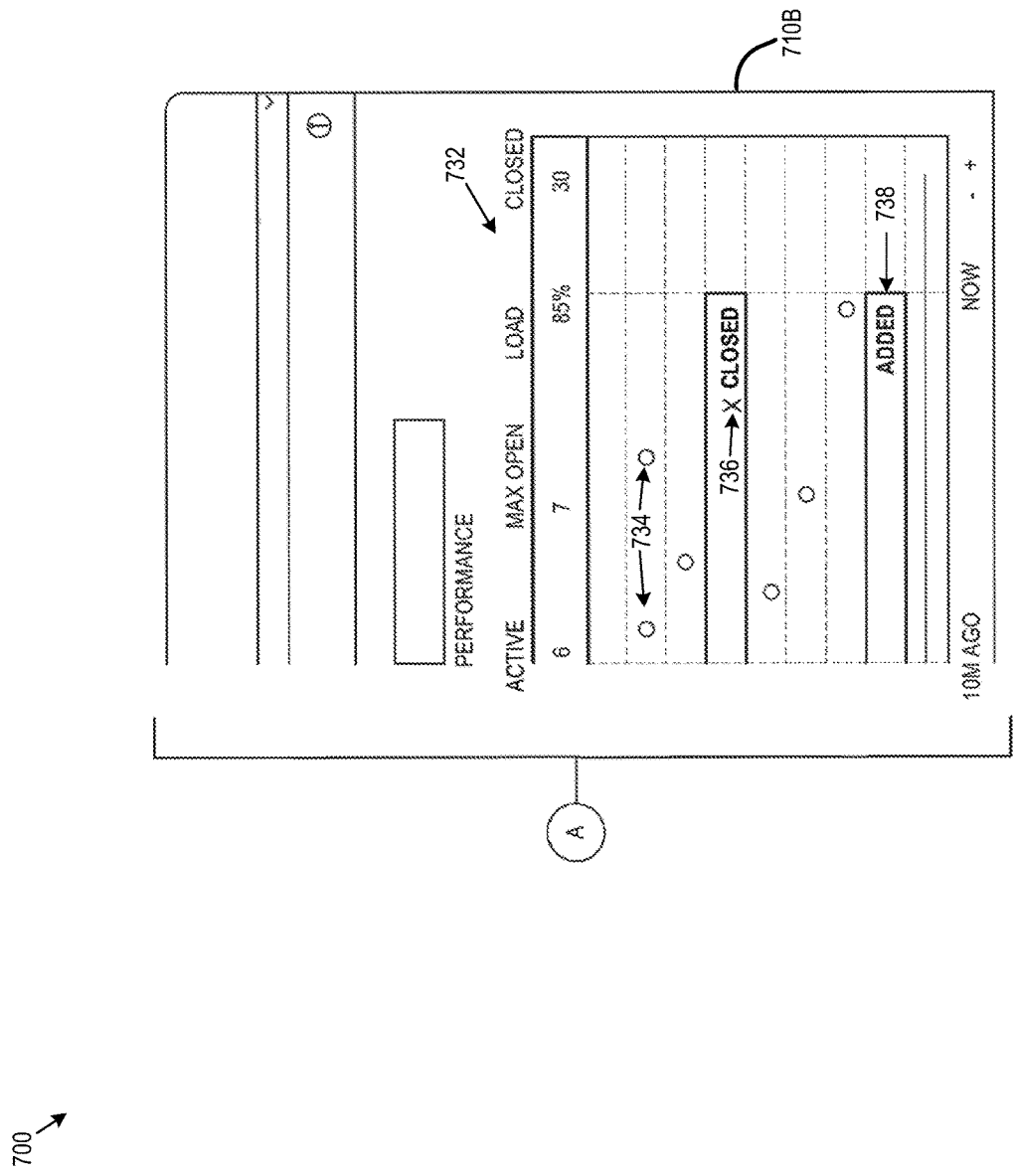
FIG. 7B illustrates aspects of a dashboard interface implementation that includes information regarding multiple agents that can be used for smart capacity workflow routing in accordance with examples described herein.

FIGS. 7A and 7B illustrates an exemplary dashboard 700 that includes information regarding multiple agents 730. FIG. 7A illustrates a left portion of an example interface display 710A, and FIG. 7B illustrates a right portion of an example interface display 710B, which would be connected at interface line A. Such dashboard information, which may be tracked for each agent concerning capacity and performance, may be used to identify current levels of capacity and to make decisions regarding workload assignments. As illustrated, the information for each agent 730 may include category data 732 such as agent name, agent group, online rate, state duration, one or more categories of skills, open slots, active slots, current load, and number of closed communications. Selections of different category data 732 can be used to adjust the information shown in dashboard 700. Such information may be updated dynamically (e.g., as the information is received and processed in devices of a system), which allows for dynamic updating of aggregated workloads and workload capacities for each agent as well. The data generated can then be stored and presented in a timeline 740 as a history of capacity usage, which can be used in future routing of requests as workload models are updated based on performance history. As the current workload for one or more communications are updated and adjusted, therefore, such updates and adjustments result in a different aggregated workloads and therefore different workload capacities. The illustrated dashboard 700 shows assigned communication slots, including communication slots 734.

For example, an agent may be identified by name, agent group, skills, and as having six activated slots out of a maximum of seven slots, which represents an aggregated workload of 85%. Some systems may define a target workload level so as to maximize metrics regarding productivity (e.g., number of user communications closed) at the same time as user satisfaction indicators. A workload model may be geared, for example, towards identifying not only ow to handle as many user communications s as possible, but to do so in a way that sustains at least a minimum threshold for user satisfaction. As such, the target workload may not be quite at 100% of total capacity, but may be set between 80-90%.

A dashboard 700 can additional include indicators in a timeline for when an agent enters or leaves the system via a closed 736 or added 738 indicator. Additional information can include information on communications ending, and elements of how the communication ended (e.g., with a resolution or not for a user problem).

Figure 8A:
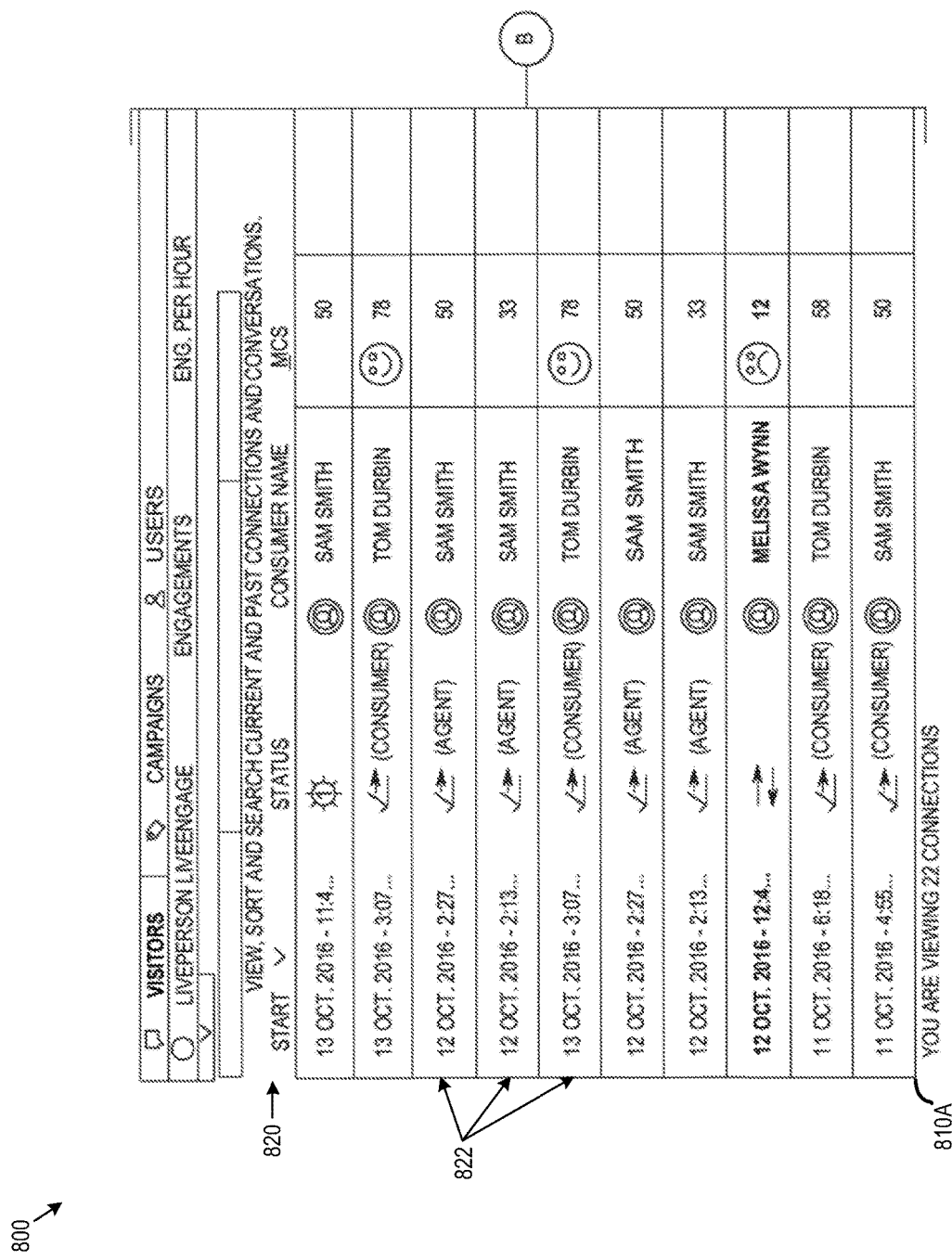
FIG. 8A illustrates aspects of a dashboard interface implementation that includes information regarding multiple user communications that can be used for smart capacity workflow routing in accordance with examples described herein.

FIGS. 8A and 8B illustrate a dashboard 800 interface that includes information regarding multiple user communications. FIG. 8A illustrates a left portion of an example interface display 810A, and FIG. 8B illustrates a right portion of an example interface display 810B, which would be connected at interface line B. Dashboard 800 includes a set of category data 820 and communication 822 entries. As illustrated, each user communication 822 may be associated category data 820 which can include a start time, status, user name, MCS sentiment indicator, skill category, agent name, agent group, last message time, and duration. Other implementations can include other such category data. Such information regarding multiple different user communications may be incorporated into a workload model that may be used to predict a measurement of workload associated with an incoming request for a new user communication. As the number of user communications grow, the body of information regarding the same likewise grow and may be used to improve the workload model for use to generating predictions regarding new and incoming user communications.

Information about particular communication 822 entries can, for example, be associated with certain factors of a model. For example, keywords from an incoming request, characteristics of a user, user history data, client associations for particular issues and user communications, and other such information can have associated factors. When an incoming request is received from a user for a user communication, factors identified from the request can be used to generate a workload measurement for the communication. This workload measurement can predict the workload associated with a user communication. The workload measurement can be a time based intensity curve (e.g., an expected communication intensity over time) or general information about expected workload characteristics (e.g., a communication time, a maximum expected communication intensity, an average and standard deviation of an expected communication intensity, or other statistical estimates that can model an agents workload from a particular user communication.)

In dashboard 800 success of the conversation may be indicated by a survey or by analyses of the user communication (e.g., indications of praise and thanks versus criticism in user feedback or system analysis of a user communication). In addition to the actual content of the conversation, certain other parameters and metrics may be tracked and measured in order to evaluate success and improve how later conversations are designed. For example, information regarding text size, message length, timing and duration, different icons (e.g., to indicate bot or human agent), and other such factors may be tracked to evaluate the relative successes and workload history for a communication. Sentiment indicators may be assigned, for example, to quantify a degree of success of a conversation. Such sentiment indicators may be based on the language and statements provided by the consumer/user during the conversation. Such indicators may be used to weight the workload model with respect to factors associated with high user satisfaction indicators and against factors associated with low user satisfaction indicators. The factors may further be used to identify a target capacity at which to load an agent for efficient performance with respect to a number of concurrent or simultaneous communications in a way that considers the respective difficulty of the same and that maintains at least a certain level of user satisfaction. Aspects of such analysis can be used in general workload models for all agents in a system. Other aspects can be used in personal workload models for individual agents, or segment workload models for agents that share certain characteristics (e.g., expertise, identified skills, agent groups, experience, system group, etc.)

Figure 9:
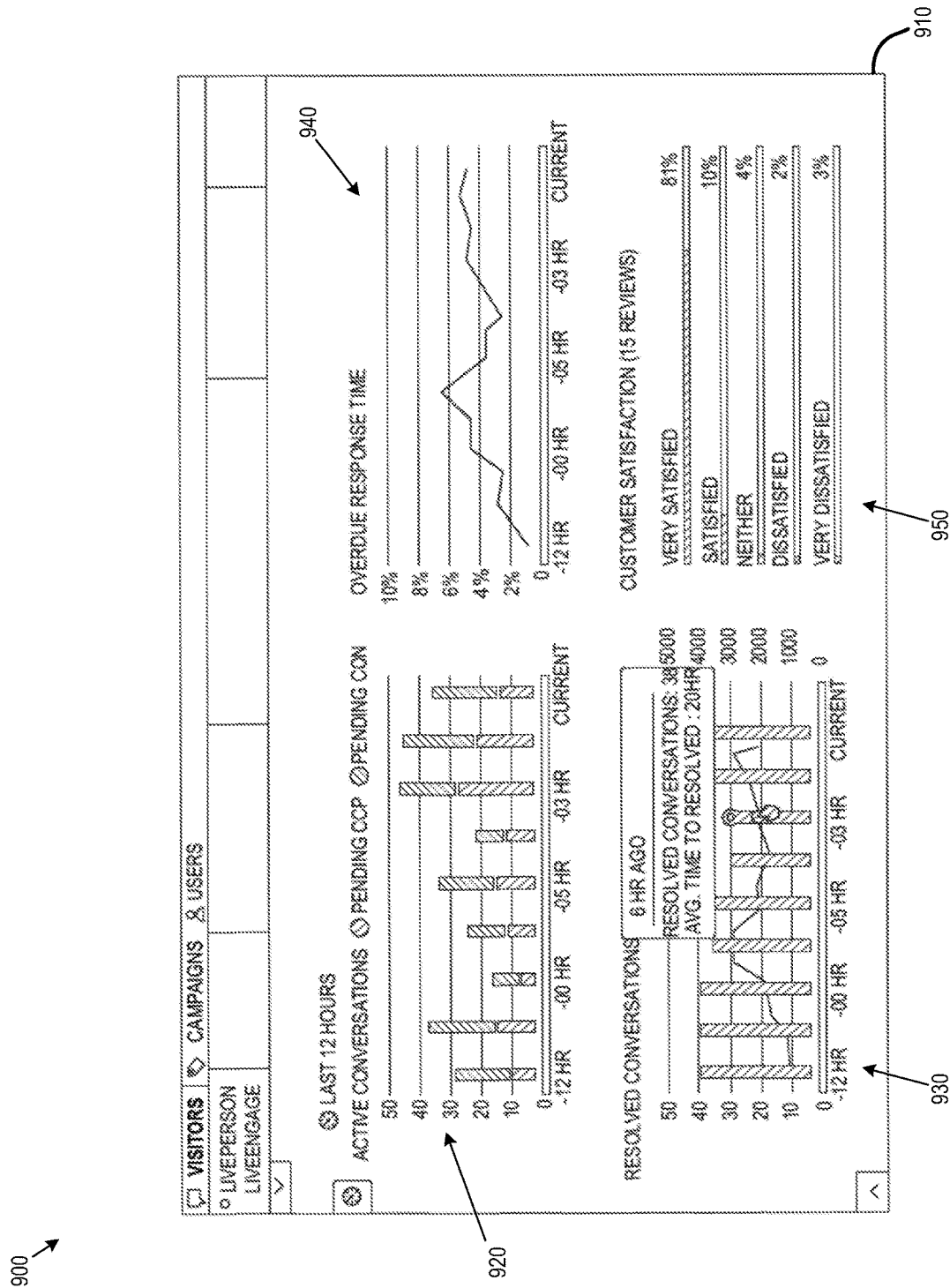
FIG. 9 illustrates an implementation of a dashboard interface that for smart capacity workload routing in accordance with examples described herein.

FIG. 9 illustrates a dashboard 900 that tracks multiple communications, as well as timing, progress/status, and satisfaction levels thereof for display in a user interface screen 910. As illustrated, various parameters regarding such communications may be tracked and evaluated as communications occur. Ongoing communications may therefore be evaluated to identify whether a response may be overdue, by how much, and what user satisfaction levels have been achieved. Such data may be tracked to identify which factors may contribute to user satisfaction and which factors may detract from the same. Such factors can also be used to assess performance of a smart capacity system in balancing workload, with history data used to update workload models and improve routing in future workload routing. In some examples, a system may set certain performance involvements or goals that entail a predetermined threshold level of user satisfaction. The workload model discussed herein may therefore be developed and updated in order to achieve at least the threshold level of user satisfaction.

As illustrated in dashboard 900, data 920 tracks active conversations in a system over time, including current conversations. Data 930 tracks a number of resolved conversations over time. Data 940 tracks response times in agent conversations against threshold metrics to determine aggregate delays and overdue responses for all agents in a system. Such data can be analyzed to determine if additional agents are needed at certain times, or if routing inefficiencies are causing system performance issues (e.g., by comparing individual agent performance against aggregate agent performance to determine if all agents are experiencing similar overdue response time issues, or only certain agents). Data 950 includes user satisfaction information for a particular time period. Additional implementations of such data can chart such data over time or against other factors to identify correlations and areas where routing or agent routing can improve user responses and system performance.

Figure 10:
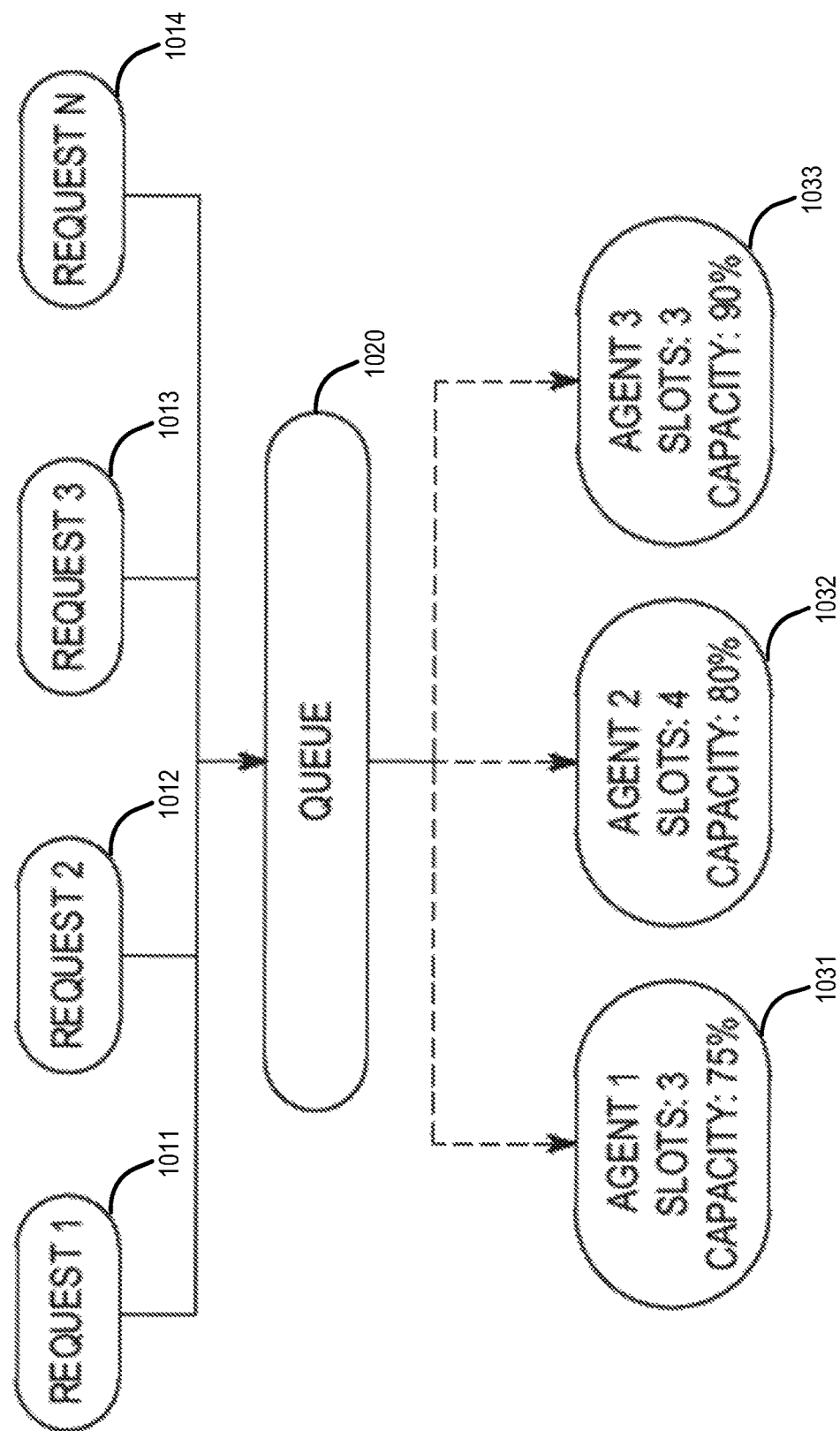
FIG. 10 illustrates aspects of a method for dynamic and intelligence-driven routing of workload capacity in accordance with some examples described herein.

FIG. 10 is a flowchart illustrating aspects of a model for dynamic and intelligence-driven routing of workload capacity. For a given system or industry, workload may be defined differently, such that a single system can use different workload models for different clients. When an agent handles user communications for different clients, different workload measurements and different request factors can be normalized into a shared workload measurement so that an aggregated workload and a resulting current workload capacity can be generated and standardized for agents serving different clients (e.g., different system models or industries). In one example of a workload model as illustrated in FIG. 10, includes a user component and an agent component. ally, the user component may include a pace at which a user may provide input or follow up in requests 1011, 1012, 1013, 1014, routed through queue 1020 while the agent component may include an identified amount of work 1031, 1032, 1033 by an agent in order to interact with the user. The user component can be considered an intensity or workload measurement for a particular user communication over time. The workload model may be generated by continuous analysis of communication data from multiple communications to identify properties and factors that are associated with an identified pace at which a user may provide input or follow up and that are associated with an identified amount of work by an agent in order to interact with the user. Such properties and factors may include any parameter or metric that can be tracked regarding a communication, such as those illustrated in the example user interfaces of FIGS. 6-9. These parameters, metrics, and factors can also consider the medium of communication (e.g., web browser, messaging application, voice, etc.) which can impact a speed of follow-up by the user (e.g., a user typing 80 words per minute on a keyboard versus a user using thumb entry on a 12-button phone). Additional factors can include communication timing, time of day, textual analyses, level of difficulty, level of activity, identified topics, history of user or agent, or current stage of the communication.

The workload model may be updated based on new communication information, may be stored in memory of a device (e.g., a computer implementing connection routing system 150, smart capacity routing 1230, etc.) Such workload models may associate the respective user component and agent component in association with a set of different factors. Each factor may indicative of a measurement of workload defined in a manner to the industry or particular system goals. In a call center, for example, workload may be defined in terms of a standard unit (e.g., call slot) or in terms of percentage. Whereas prior implementations of call center systems may automatically route calls to agents each tasked with handling a predefined number of slots, the present method may include dynamically assigning a number of slots to each agent and activating (and inactivating) slots as needed. Such examples improve the operation of communication systems, networks, and individual devices by optimizing the use of processing and network resources, and therefore improving throughput of the system and avoiding system imbalances which waste computing resources and degrade performance.

Examples described herein thus include a computing machine that can actively manage capacity for hundreds of agents handling thousands of active user communications. Each user communication in the system can be monitored, such that data within such communications are analyzed in real-time (e.g. as the communications are happening, including network travel and processing delays). The data within the active user communications can be used to dynamically update an aggregated capacity for an agent within the system. In some examples, this happens for every piece of data, so that for an agent handling multiple user communications with each user communication involving a data exchange on the network at varying frequencies, this dynamic update can involve an individual agent having a capacity updated in the system every few seconds. For a system with hundreds of agents, this can involve a connection management system updating multiple different agent capacities every second. The update process can additionally involve multiple complex calculations in a context of one or more management models. For example, the aggregated capacity for an agent that is handling user communications with different analysis elements (e.g. due to the user communications being for different issues, clients, delay states, etc.) can involve updates to analysis elements and calculations for a workload measurement for each user communication, which is then further calculated in a context of the workload measurement for each user communication being handled by the agent. The aggregated workload capacity for an individual agent can thus involve multiple sets of analysis elements each having a different workload model to determine availability of an agent. As a system receives a new request for a user communication, the real-time state of the agent capacities as determined using the workload measurements and aggregate capacity for each agent are used to determine how to route the new incoming request for a user communication (e.g. a new session between a user and an agent).

Figure 11:
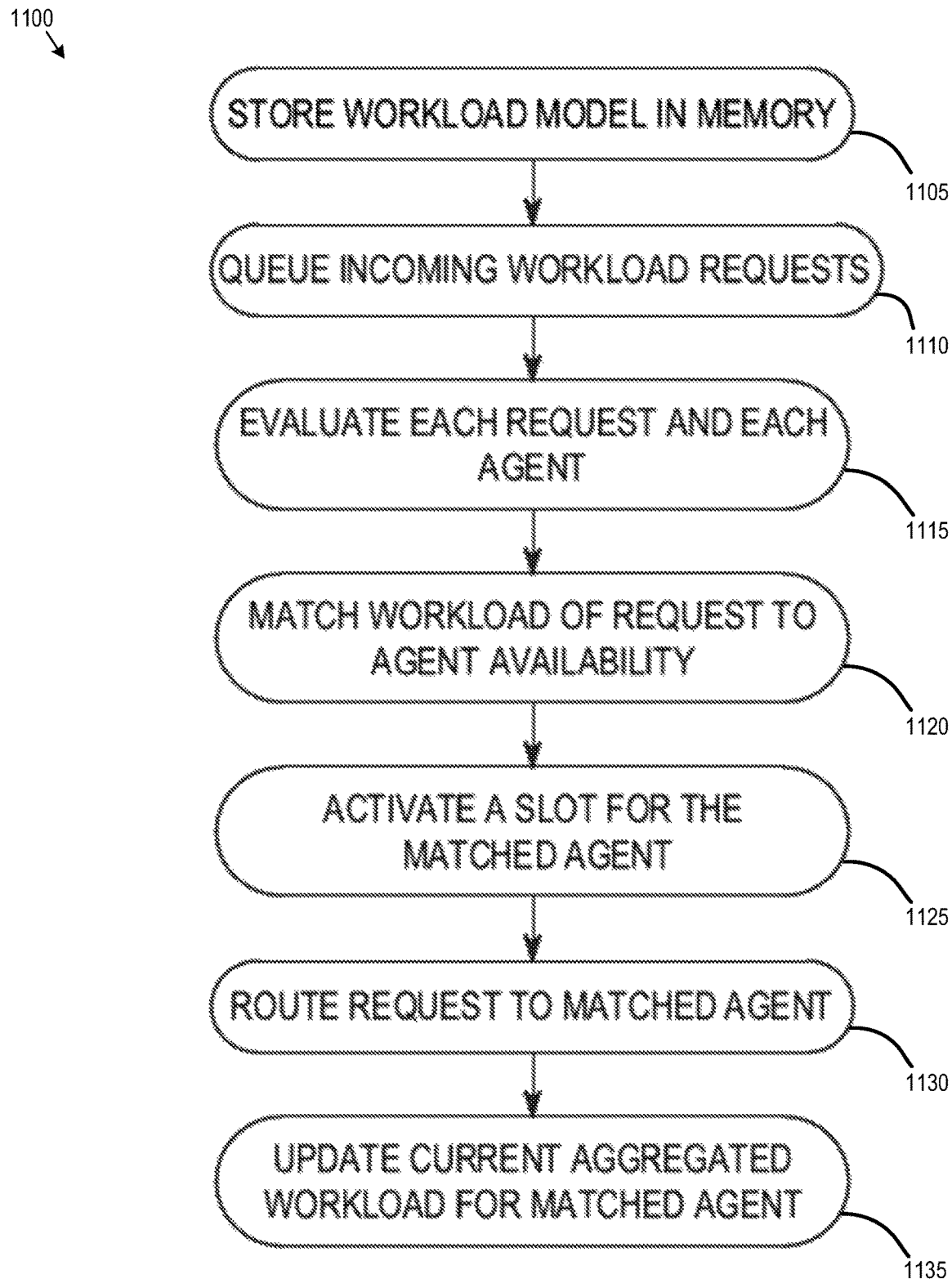
FIG. 11 is a diagram of request routing based on dynamic workload capacity in accordance with some examples described herein.

FIG. 11 is a diagram of a request routing method 1100 based on dynamic workload capacity. As illustrated, a workload model is stored in memory in step 1105. In step 1110, incoming requests for user communications may be received and queued. The received request may include information regarding one or more of the factors referenced in the workload model. In step 1115, each request received at a system is evaluated along with agent capacity. This evaluation can include workload measurements identified for the requested user communication based on comparing the received request information to the stored workload model (e.g., matching factors identified from a message such as a communication topic with workloads predicted by the workload model for a message with similar factors). Each agent may be evaluated to identify a respective current workload capacity.

As illustrated, each agent may be handling the same or different number of slots. The identified capacity for each agent, however, may be different. That is because each incoming user communication that is being handled simultaneously by an agent may be dynamically assigned a workload measurement based on the comparison to the workload model. The measurements associated with an agent may further be aggregated to identify a total aggregated workload for that specified agent. The aggregated workload may therefore be used to evaluate whether a particular agent may have the capacity to handle the measurement of workload associated with an incoming communication simultaneously with a current set of communications in step 1120. In cases where multiple agents may have enough capacity, routing the incoming request may be based on comparing the respective capacity (e.g., aggregated workload) among the agents.

Then, in step 1125 an agent may be selected to handle the incoming request. In particular, it may be determined that the identified agent is identified as having a current workload capacity to handle the identified workload measurement from step 1120, and a slot activated for the identified agent in step 1125. Such identification may be based on evaluating the measurement of workload identified for the incoming request and the aggregated workload for each agent. A communication slot may be activated for the identified agent and defined by the identified workload measurement. The incoming request may be routed to the identified agent in step 1130. Then in step 1135, a current workload capacity of the identified agent may be updated based on the identified workload measurement. Such update may include aggregating the identified workload for the requested user communication with one or more simultaneous user communications currently handled by the identified agent.

In some examples, a workload capacity can be routed as capacity changes during the user communication due to a changed level in workload. Such prediction may be based on the various factors that may be tracked for a communication, including certain textual or verbal indicators. For example, the user may switch topics from a generic query for standard information to a more in-depth and personalized query for information. In such instance, the prediction may include an adjustment to the workload measurement initially identified for the communication. Such prediction made for a particular communication may further result in dynamically adjusting the identified workload measurement associated with the requested user communication as the communication is received. In turn, the adjusted workload measurement may be used to dynamically adjust the aggregated workload capacity of the identified agent as the agent is communicating with assigned users and assigned communication channels. Subsequent requests may therefore evaluated vis-à-vis the identified agent based on the updated aggregated workload capacity.

Figure 12:
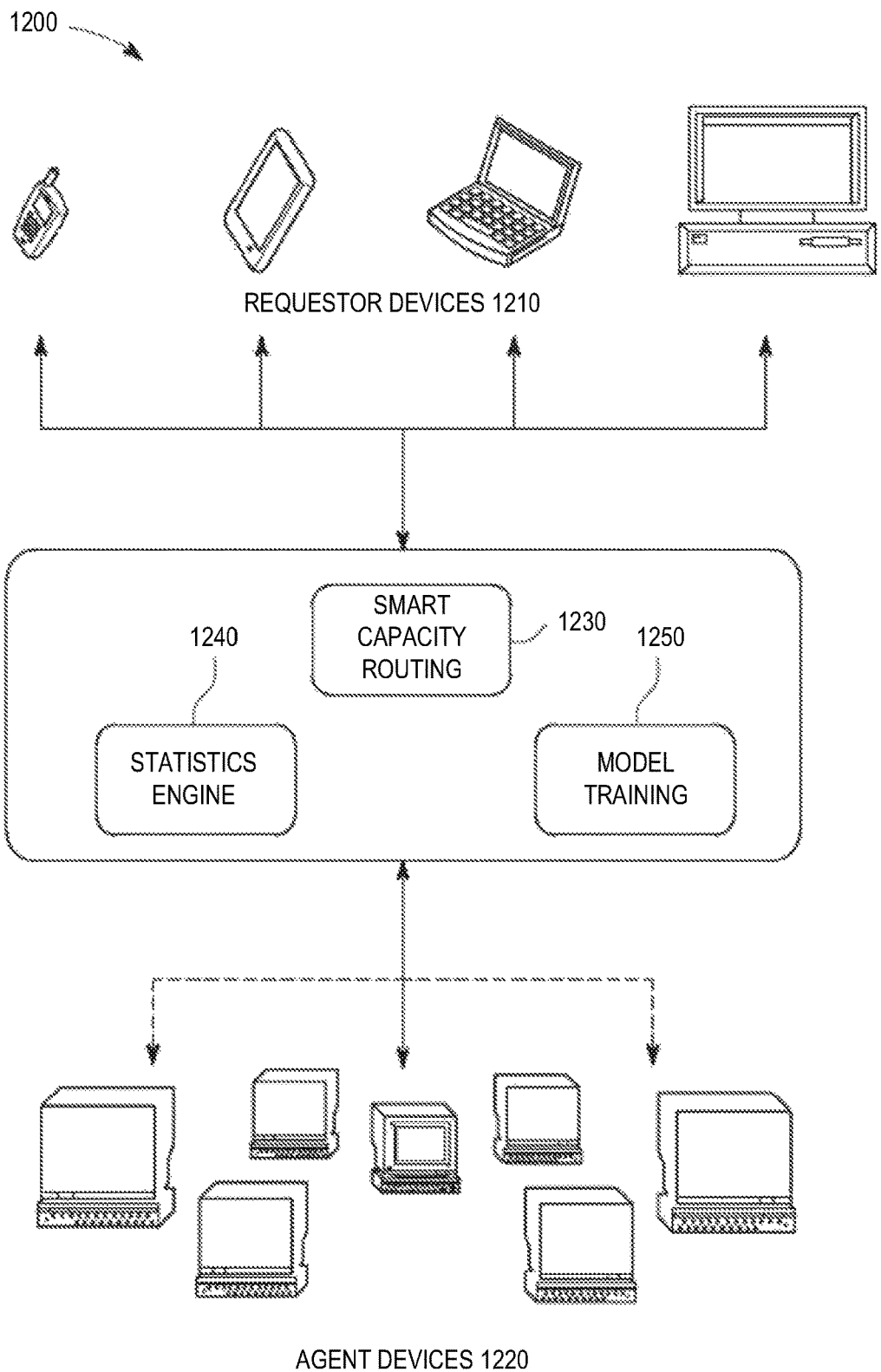
FIG. 12 shows an example process for switching between a bot and a terminal device during a communication session.

FIG. 12 illustrates an exemplary network environment in which a system 1200 for dynamic and intelligence-driven routing of workload capacity may be implemented. Requestor devices 1210 may include a variety of user devices known in the art for communicating over a communication network, including requests for user communication corresponding such as illustrated in FIG. 11. Agent devices 1220 may likewise include a variety of different computing devices known in the art for interacting with the requestor devices 1210. Agents illustrated in FIG. 11 may use such agent devices 1220 to interact with assigned requestors. Smart capacity routing 1230 is inclusive of a variety of computing devices (e.g., servers) configured to perform the method described in relation to FIGS. 10 and 11. Statistics engine 1240 may include a variety of computing devices connected to the communication network (e.g., Internet) by which requestor devices 1210 and agent devise 1220 communicate. Statistics engine 1240 may be configured to analyze information within the communication so as to generate features and make predictions regarding subsequent conversation intensity. Such predictions may be based on a workload model such as described herein. Model training 1250 may use communication data to train the workload model so as to refine and improve predictions. In some examples, model training 1250 may collect past communication data (e.g., use imported data) to build a model, as well as incorporate current communication data to continue improving predictions. As described above, different independent models can be structured and used with a common workload metric to allow an agent to service different users with request factors associated with different workload models. In other implementations, such variations are structured in a single workload model that can accommodate different users with communication requests for a wide variety of systems and problem types.

Figure 13:
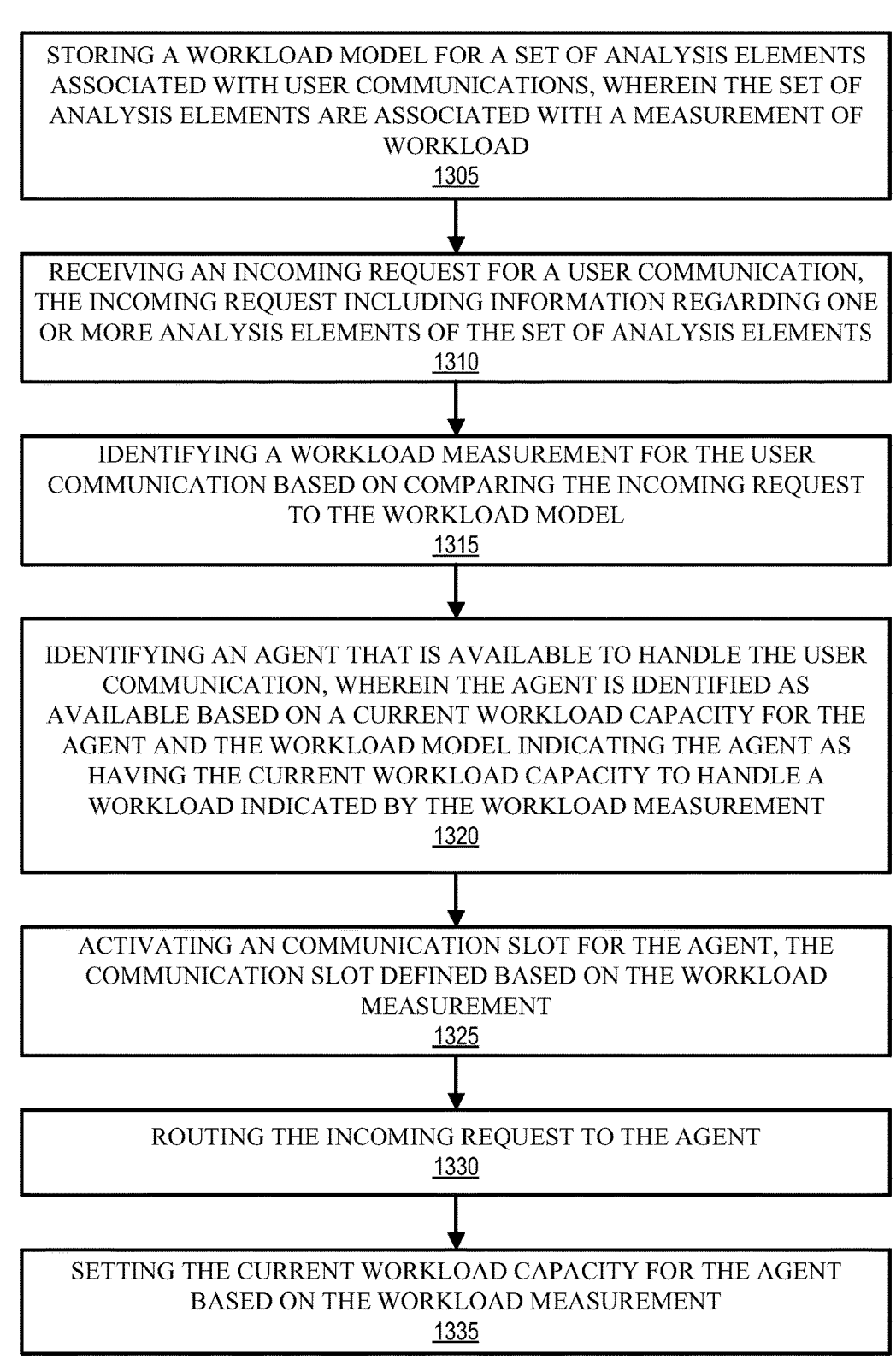
FIG. 13 shows flowchart illustrating a method of smart capacity workload routing in accordance with examples described herein.

FIG. 13 then shows a flowchart illustrating a method 1300 of smart capacity workload routing in accordance with examples described herein. In some implementations, method 1300 can be implemented by a device (e.g., a computer, a server, or any machine described herein or other such suitable device) with processing circuitry configured to perform or assist in the operations of method 1300. In some implementations, method 1300 can be implemented as computer readable instructions that, when executed by a one or more processors of a device or system, cause performance of method 1300.

Method 1300 includes step 1305 where a memory stores a workload model for a set of factors associated with user communications. The set of factors are associated with a measurement of workload. In some examples, the workload model is based on a set of past user communications, and wherein the set of past user communications are associated with user satisfaction indicators that are above a predetermined minimum threshold. In some example implementations, the set of factors in the workload model includes a pace of user communication. In some examples, the set of factors in the workload model includes an amount of work needed from the agent to engage in the user communication. In some examples, the set of factors in the workload model includes at least one of a messaging medium used to request the user communication, a time of day associated with a request, a topic of the request, a level of difficulty of the request, or a stage of the request. In various implementations, any combinations of such implementations can be used, and additional elements can be used in addition to any such combination.

In step 1310 a device receives an incoming request (e.g., a data communication) for a user communication, with the incoming request including information regarding one or more factors of the set of factors (e.g., as described above). The request can be received using communication interface circuitry of a device, which is passed to processing circuitry and processed for various identification and analysis operations. In some examples, multiple factors are present, with each factor associated with a different workload measurement. The different workload measurements for different factors can be used as part of the workload model for smart capacity routing.

A workload measurement is then identified in step 1315 for the user communication based on comparing the incoming request to the workload model. In some implementations, multiple factors from the incoming request can be used in different ways within a workload model. In some implementations, multiple factors from the incoming request can be used for a single workload measurement of a workload model. In some implementations, an individual factor of multiple factors of a set of factors can be used in multiple different workload measurements of a workload model (e.g., different workload measurements used to generate an aggregated workload from a workload model structured for multiple different workload measurements in the model).

An agent that is available to handle the user communication is then identified in step 1320. As part of this step, the agent is identified as available based on a current workload capacity for the agent and the workload model indicating the agent as having the current workload capacity to handle a workload indicated by the workload measurement. In some examples, the current workload capacity of the agent is determined based on a current aggregated workload associated with one or more simultaneous user communications currently handled by the agent. In some implementations, identifying the agent includes selecting the agent from a plurality of different agents that each have a different current aggregated workload capacity, where selecting the agent is based on a comparison of the different current aggregated workload capacity for each of the plurality of different agents. In some implementations, the agent is selected from a plurality of different agents that each currently handles a different number of communication slots. In some implementations, identifying the agent includes comparing the workload measurement to an available workload capacity of the agent. The workload capacity can be an aggregated workload capacity based on a set of current simultaneous communications assigned to the agent. This aggregation can include communications on different communication channels (e.g., voice, text, messaging, etc.) which adjust as communication rates on various channels change and communications end or change in intensity. Monitoring changes in communication intensity (e.g., based on communication frequency or content indicating user expectations of responsiveness or importance in focused response) can be used in dynamically adjusting an aggregated workload capacity of an agent, including the workload measurement for a particular user communication, as the communication occurs. In some examples, a prediction about upcoming workloads for a communication can be used. Such predictions can estimate upcoming communication intensity, which can be based on a topic history for the user or other users, patterns observed in user communications, models generated for user communications, agent feedback, analysis of communication content, or any other such data. Such predictions can be used to adjust a workload measurement and an aggregated workload and workload capacity for an agent. These predictions allows accurate workload routing as an agents capacity is updated as communications occurs (e.g., with delays based on communication system delays, analysis delays, or other such delays as data is received and processed to update models and measurements.) Various implementations can use combinations of such elements.

In step 1325, a communication slot for the agent is activated with the communication slot defined based on the workload measurement. In some implementations, a number of communication slots are available for an agent, with a maximum number of available communication slots changing based on the expected workload associated with each communication slot. In some implementations, each communication slot is associated with communications for a single user on a single channel (e.g., a voice channel or a text channel). In some implementations, a maximum number of communication slots is set for an individual user regardless of the communication intensity of each communication, to limit an agent from being overwhelmed if multiple communications spike in intensity at the same time. In some implementations, an agent is not assigned a new request until a slot opens as a previous communication ends.

In step 1330 the incoming request is routed to the agent. The communication associated with the request can then be monitored as described above, to adjust the workload associated with the request. In some implementations, a predicted workload can be compared with the actual workload to update the agent capacity. If a workload is lower than predicted, additional requests can be routed to the agent. A workload buffer can be expanded if multiple requests involve lower than expected workload, to address spikes or shifts in workload intensity that can occur and exceed an agent capacity. If a workload is higher than predicted, new requests can be routed to other agents, delayed, or other capacity routing actions can be taken. This workload routing can include requesting a schedule later communication with new requests or pending requests that are low priority or low intensity.

In step 1335, method 1300 includes an update to the current workload capacity for the agent based on the workload measurement. In some examples, the current workload capacity of the agent is based on aggregating the workload for the user communication with one or more simultaneous user communications currently handled by the agent.

While method 1300 describes a single user communication being routed, a connection management system can handle any number of incoming requests for user communication, and can analyze and update agent workload capacity using data from any number of agents handling any number of user communications. Example systems can thus analyze data from thousands of user communications in real time to update capacity data for hundreds of agents in a system. Other implementations can handle any number of communications and agents, with new incoming requests parsed for analysis elements and routed based on availability calculated from complex and consistently updated availability data (e.g. current workload capacity for an agent). Additionally, even in smaller systems, a connection management device can handle bursts of data. For example, even though a system may only handle a few dozen user communications at a time, the system can process multiple requests for user communications at the same time. Thus, if ten user requests are received in a one second time period, rather than waiting for an operator to process each request, the system can process and assign all of the requests to an appropriate agent based on the real-time current workload capacity of each agent as the real-time current workload capacity is being updated. Any queue for new incoming user communication request can, in such embodiments, simply be memory that stores data as the data is processed and communicated through a system. Similarly, as user communications resolve and end, the system can identify this immediately, and automatically update the agent current workload capacity.

As described above and illustrated in the various interfaces shown above, the communications assigned to an agent can generate data regarding agent performance, system performance, or any other such metric. As part of such operations, a management device can use one or more processors to parse data from user communications, and use performance models (e.g. matching performance expectations, user feedback history, and other such data) to match data from the user communication with a performance metric. Other data, such as direct user feedback, timing and responsiveness data from the user communication, and any other such data can also be collected for performance. Additionally, in a system with many agents each handling many user communications in a time period, comparisons between communication data for different agents can be used for performance analysis. This can involve processing circuitry parsing thousands of words of text and correlating additional analysis elements with the parsed text to create performance data and performance analysis outputs. This information can then be aggregated in various ways to provide feedback on agent performance, updates to workload models, updates to workload prediction calculations update models to agent capacity, and can include individualized metrics on agent capacity and performance. For example, one agent can have a maximum capacity that differs from another agents maximum capacity, and the data generated can be used to both modify an overall set of data for all agents, as well as customized or agent data. This difference can also be determined from data on a type of agent, or any other such information about an agent. For example, agents can be categorized by experience, specialization, communication types, or other such information, and groups of agents based on such categories can be used to analyze and update system operation for such groupings.

While various steps are described above, it will be apparent that certain steps can be repeated, and intervening steps can be performed as well. Additionally, different devices in a system will perform corresponding steps, and various devices can be performing multiple steps simultaneously. For example, a device can perform such steps to route requests to multiple agents simultaneously, with devices of multiple different agents performing corresponding operations, and the agent devices communicating with user devices.

Figure 14:
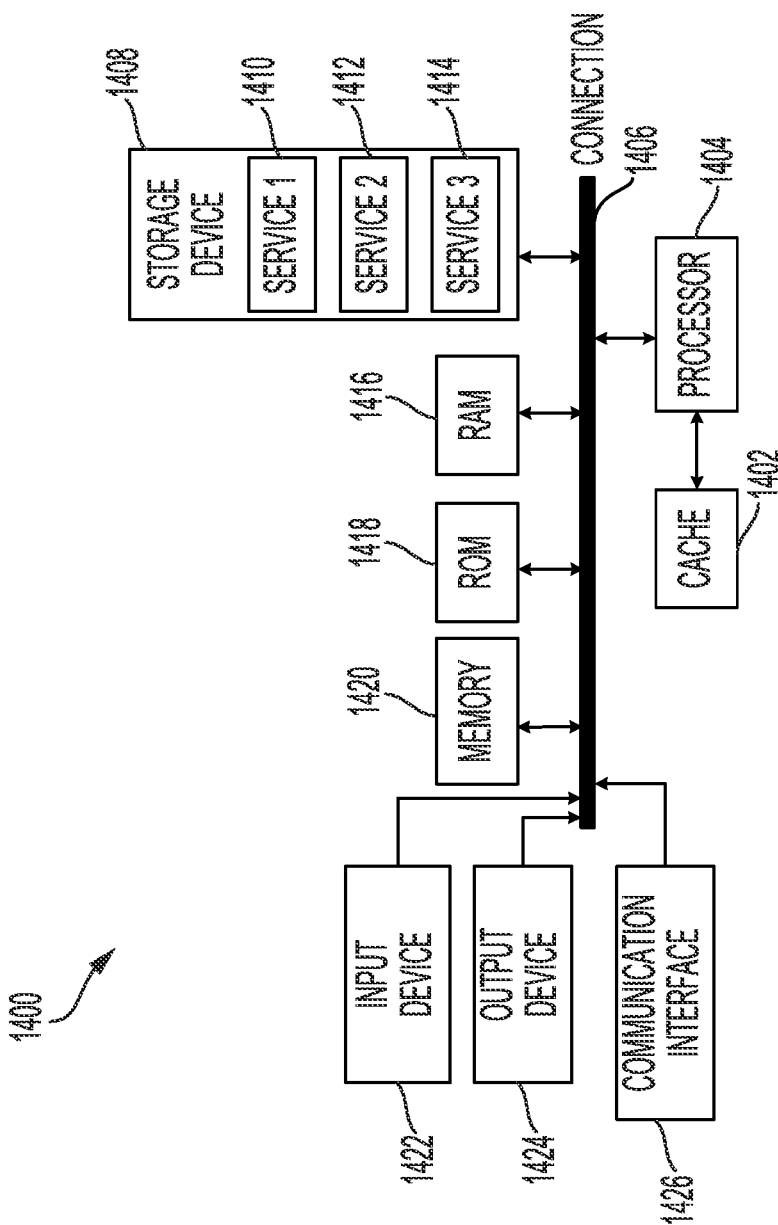
FIG. 14 shows an example computing device that can be used to implement various components of systems in accordance with examples described herein.

FIG. 14 illustrates a computing system architecture 1400 including various components in electrical communication with each other using a connection 1406, such as a bus, in accordance with some implementations. Example system architecture 1400 includes a processing unit (CPU or processor) 1404 and a system connection 1406 that couples various system components including the system memory 1420, such as ROM 1418 and RAM 1416, to the processor 1404. The system architecture 1400 can include a cache 1402 of high-speed memory connected directly with, in close proximity to, or integrated as part of the processor 1404. The system architecture 1400 can copy data from the memory 1420 and/or the storage device 1408 to the cache 1402 for quick access by the processor 1404. In this way, the cache can provide a performance boost that avoids processor 1404 delays while waiting for data. These and other modules can control or be configured to control the processor 1404 to perform various actions.

Other system memory 1420 may be available for use as well. The memory 1420 can include multiple different types of memory with different performance characteristics. The processor 1404 can include any general purpose processor and a hardware or software service, such as service 1 1410, service 2 1412, and service 3 1414 stored in storage device 1408, configured to control the processor 1404 as well as a special-purpose processor where software instructions are incorporated into the actual processor design. The processor 1404 may be a completely self-contained computing system, containing multiple cores or processors, a bus, memory controller, cache, etc. A multi-core processor may be symmetric or asymmetric.

To enable user communication with the computing system architecture 1400, an input device 1422 can represent any number of input mechanisms, such as a microphone for speech, a touch-sensitive screen for gesture or graphical input, keyboard, mouse, motion input, speech and so forth. An output device 1424 can also be one or more of a number of output mechanisms known to those of skill in the art. In some instances, multimodal systems can enable a user to provide multiple types of input to communicate with the computing system architecture 1400. The communications interface 1426 can generally govern and control the user input and system output. There is no restriction on operating on any particular hardware arrangement and therefore the basic features here may easily be substituted for improved hardware or firmware arrangements as they are developed.

Storage device 1408 is a non-volatile memory and can be a hard disk or other types of computer readable media which can store data that are accessible by a computer, such as magnetic cassettes, flash memory cards, solid state memory devices, digital versatile disks, cartridges, RAMs 1416, ROM 1418, and hybrids thereof.

The storage device 1408 can include services 1410, 1412, 1414 for controlling the processor 1404. Other hardware or software modules are contemplated. The storage device 1408 can be connected to the system connection 1406. In one aspect, a hardware module that performs a particular function can include the software component stored in a computer-readable medium in connection with the necessary hardware components, such as the processor 1404, connection 1406, output device 1424, and so forth, to carry out the function.

The disclosed gift selection, attribution, and distribution system can be performed using a computing system. An example computing system can include a processor (e.g., a central processing unit), memory, non-volatile memory, and an interface device. The memory may store data and/or and one or more code sets, software, scripts, etc. The components of the computer system can be coupled together via a bus or through some other known or convenient device. The processor may be configured to carry out all or part of methods described herein for example by executing code for example stored in memory. One or more of a user device or computer, a provider server or system, or a suspended database update system may include the components of the computing system or variations on such a system.

This disclosure contemplates the computer system taking any suitable physical form. As example and not by way of limitation, the computer system may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, the computer system may include one or more computer systems; be unitary or distributed; span multiple locations; span multiple machines; and/or reside in a cloud, which may include one or more cloud components in one or more networks. Where appropriate, one or more computer systems may perform without substantial spatial or temporal limitation one or more steps of one or more methods described or illustrated herein. As an example and not by way of limitation, one or more computer systems may perform as events occur or in batch mode aggregating multiple events, such as over one or more steps of one or more methods described or illustrated herein. One or more computer systems may perform at different times or at different locations one or more steps of one or more methods described or illustrated herein, where appropriate.

The processor may be, for example, be a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory can be coupled to the processor by, for example, a bus. The memory can include, by way of example but not limitation, random access memory (RAM), such as dynamic RAM (DRAM) and static RAM (SRAM). The memory can be local, remote, or distributed.

The bus can also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software can be stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory herein. Even when software is moved to the memory for execution, the processor can make use of hardware registers to store values associated with the software, and local cache that, ideally, serves to speed up execution. As used herein, a software program is assumed to be stored at any known or convenient location (from non-volatile storage to hardware registers), when the software program is referred to as "implemented in a computer-readable medium." A processor is considered to be "configured to execute a program" when at least one value associated with the program is stored in a register readable by the processor.

The bus can also couples the processor to the network interface device. The interface can include one or more of a modem or network interface. It will be appreciated that a modem or network interface can be considered to be part of the computer system. The interface can include an analog modem, Integrated Services Digital network (ISDN0 modem, cable modem, token ring interface, satellite transmission interface (e.g., "direct PC"), or other interfaces for coupling a computer system to other computer systems. The interface can include one or more input and/or output (I/O) devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device.

In operation, the computer system can be controlled by operating system software that includes a file routing system, such as a disk operating system. One example of operating system software with associated file routing system software is the family of operating systems known as Windows® from Microsoft Corporation of Redmond, Wash., and their associated file routing systems. Another example of operating system software with its associated file routing system software is the Linux™ operating system and its associated file routing system. The file routing system can be stored in the non-volatile memory and/or drive unit and can cause the processor to execute the various acts involved by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless ally stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within registers and memories of the computer system into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some examples. The involved structure for a variety of these systems will appear from the description below. In addition, the techniques are not described with reference to any particular programming language, and various examples may thus be implemented using a variety of programming languages.

In various implementations, the system operates as a standalone device or may be connected (e.g., networked) to other systems. In a networked deployment, the system may operate in the capacity of a server or a client system in a client-server network environment, or as a peer system in a peer-to-peer (or distributed) network environment.

The system may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any system capable of executing a set of instructions (sequential or otherwise) that specify actions to be taken by that system.

In general, the routines executed to implement the implementations of the disclosure, may be implemented as part of an operating system or an application, component, program, object, module or sequence of instructions referred to as "computer programs." The computer programs typically include one or more instructions set at various times in various memory and storage devices in a computer, and that, when read and executed by one or more processing units or processors in a computer, cause the computer to perform operations to execute elements involving the various aspects of the disclosure.

Moreover, while examples have been described in the context of fully functioning computers and computer systems, those skilled in the art will appreciate that the various examples are capable of being distributed as a program object in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In some circumstances, operation of a memory device, such as a change in state from a binary one to a binary zero or vice-versa, for example, may include a transformation, such as a physical transformation. With particular types of memory devices, such a physical transformation may include a physical transformation of an article to a different state or thing. For example, but without limitation, for some types of memory devices, a change in state may involve an accumulation and storage of charge or a release of stored charge. Likewise, in other memory devices, a change of state may include a physical change or transformation in magnetic orientation or a physical change or transformation in molecular structure, such as from crystalline to amorphous or vice versa. The foregoing is not intended to be an exhaustive list of all examples in which a change in state for a binary one to a binary zero or vice-versa in a memory device may include a transformation, such as a physical transformation. Rather, the foregoing is intended as illustrative examples.

A storage medium typically may be non-transitory or include a non-transitory device. In this context, a non-transitory storage medium may include a device that is tangible, meaning that the device has a concrete physical form, although the device may change its physical state. Thus, for example, non-transitory refers to a device remaining tangible despite this change in state.

The above description and drawings are illustrative and are not to be construed as limiting the subject matter to the precise forms disclosed. Persons skilled in the relevant art can appreciate that many modifications and variations are possible in light of the above disclosure. Numerous details are described to provide a thorough understanding of the disclosure. However, in certain instances, well-known or conventional details are not described in order to avoid obscuring the description.

As used herein, the terms "connected," "coupled," or any variant thereof when applying to modules of a system, means any connection or coupling, either direct or indirect, between two or more elements; the coupling of connection between the elements can be physical, logical, or any combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, or any combination of the items in the list.

Those of skill in the art will appreciate that the disclosed subject matter may be embodied in other forms and manners not shown below. It is understood that the use of relational terms, if any, such as first, second, top and bottom, and the like are used solely for distinguishing one entity or action from another, without necessarily requiring or implying any such actual relationship or order between such entities or actions.

While processes or blocks are presented in a given order, alternative implementations may perform routines having steps, or employ systems having blocks, in a different order, and some processes or blocks may be deleted, moved, added, subdivided, substituted, combined, and/or modified to provide alternative or sub combinations. Each of these processes or blocks may be implemented in a variety of different ways. Also, while processes or blocks are at times shown as being performed in series, these processes or blocks may instead be performed in parallel, or may be performed at different times. Further any numbers noted herein are only examples: alternative implementations may employ differing values or ranges.

The teachings of the disclosure provided herein can be applied to other systems, not necessarily the system described above. The elements and acts of the various examples described above can be combined to provide further examples.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further examples of the disclosure.

These and other changes can be made to the disclosure in light of the above Detailed Description. While the above description describes certain examples, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any characteristics, features, or aspects of the disclosure with which that terminology is associated. In general, the terms used in the following claims should not be construed to limit the disclosure to the implementations disclosed in the specification, unless the above Detailed Description section explicitly defines such terms. Accordingly, the actual scope of the disclosure encompasses not only the disclosed implementations, but also all equivalent ways of practicing or implementing the disclosure under the claims.

While certain aspects of the disclosure are presented below in certain claim forms, the inventors contemplate the various aspects of the disclosure in any number of claim forms. Any claims intended to be treated under 35 U.S.C. § 142(f) will begin with the words "means for". Accordingly, the applicant reserves the right to add additional claims after filing the application to pursue such additional claim forms for other aspects of the disclosure.

The terms used in this specification generally have their ordinary meanings in the art, within the context of the disclosure, and in the context where each term is used. Certain terms that are used to describe the disclosure are discussed above, or elsewhere in the specification, to provide additional guidance to the practitioner regarding the description of the disclosure. For convenience, certain terms may be highlighted, for example using capitalization, italics, and/or quotation marks. The use of highlighting has no influence on the scope and meaning of a term; the scope and meaning of a term is the same, in the same context, whether or not it is highlighted. It will be appreciated that same element can be described in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various examples given in this specification.

Without intent to further limit the scope of the disclosure, examples of instruments, apparatus, methods and their related results according to the examples of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Some portions of this description describe examples in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some examples, a software module is implemented with a computer program object including a computer-readable medium containing computer program code, which can be executed by a computer processor for performing any or all of the steps, operations, or processes described.

Examples may also relate to an apparatus for performing the operations herein. This apparatus may be specially constructed for the involved purposes, and/or it may include a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Examples may also relate to an object that is produced by a computing process described herein. Such an object may include information resulting from a computing process, where the information is stored on a non-transitory, tangible computer readable storage medium and may include any implementation of a computer program object or other data combination described herein.

The language used in the specification has been principally selected for readability and instructional purposes, and it may not have been selected to delineate or circumscribe the subject matter. It is therefore intended that the scope of this disclosure be limited not by this detailed description, but rather by any claims that issue on an application based hereon. Accordingly, the disclosure of the examples is intended to be illustrative, but not limiting, of the scope of the subject matter, which is set forth in the following claims.

details were given in the preceding description to provide a thorough understanding of various implementations of systems and components for a contextual connection system. It will be understood by one of ordinary skill in the art, however, that the implementations described above may be practiced without these details. For example, circuits, systems, networks, processes, and other components may be shown as components in block diagram form in order not to obscure the examples in unnecessary detail. In other instances, well-known circuits, processes, algorithms, structures, and techniques may be shown without unnecessary detail in order to avoid obscuring the examples.

It is also noted that individual implementations may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included. A process may correspond to a method, a function, a procedure, a subroutine, a subprogram, etc. When a process corresponds to a function, its termination can correspond to a return of the function to the calling function or the main function.

Client devices, network devices, and other devices can be computing systems that include one or more integrated circuits, input devices, output devices, data storage devices, and/or network interfaces, among other things. The integrated circuits can include, for example, one or more processors, volatile memory, and/or non-volatile memory, among other things. The input devices can include, for example, a keyboard, a mouse, a key pad, a touch interface, a microphone, a camera, and/or other types of input devices. The output devices can include, for example, a display screen, a speaker, a haptic feedback system, a printer, and/or other types of output devices. A data storage device, such as a hard drive or flash memory, can enable the computing device to temporarily or permanently store data. A network interface, such as a wireless or wired interface, can enable the computing device to communicate with a network. Examples of computing devices include desktop computers, laptop computers, server computers, hand-held computers, tablets, smart phones, personal digital assistants, digital home assistants, as well as machines and apparatuses in which a computing device has been incorporated.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

The various examples discussed above may further be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable storage medium (e.g., a medium for storing program code or code segments). A processor(s), implemented in an integrated circuit, may perform the necessary tasks.

The program code may be executed by a processor, which may include one or more processors, such as one or more digital signal processors (DSPs), general purpose microprocessors, an application integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for implementing a suspended database update system.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the implementations disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The foregoing detailed description of the technology has been presented for purposes of illustration and description. It is not intended to be exhaustive or to limit the technology to the precise form disclosed. Many modifications and variations are possible in light of the above teaching. The described examples were chosen in order to best explain the principles of the technology, its practical application, and to enable others skilled in the art to utilize the technology in various examples and with various modifications as are suited to the particular use contemplated. It is intended that the scope of the technology be defined by the claim.

What is claimed is:

1. A method comprising:
   storing a workload model for a set of analysis elements associated with user communications, wherein the set of analysis elements are associated with a measurement of workload;
   receiving an incoming request for a user communication, the incoming request including information regarding one or more analysis elements of the set of analysis elements;
   identifying a workload measurement for the user communication based on comparing the incoming request to the workload model;
   identifying an agent to handle the user communication, wherein the agent is identified based on a current workload capacity for the agent and the workload model indicating the agent as having the current workload capacity to handle a workload indicated by the workload measurement;
   activating a communication slot for the agent, the communication slot defined based on the workload measurement;

routing the incoming request to the agent; and
setting the current workload capacity for the agent based on the workload measurement.

2. The method of claim 1, further including identifying the current workload capacity of the agent based on a current aggregated workload associated with one or more simultaneous user communications currently handled by the agent.

3. The method of claim 1, wherein setting the current workload capacity of the agent is based on aggregating the workload for the user communication with one or more simultaneous user communications currently handled by the agent.

4. The method of claim 1, wherein the workload model is based on a set of past user communications, and wherein the set of past user communications are associated with user satisfaction indicators that are above a predetermined minimum threshold.

5. The method of claim 1, wherein the set of analysis elements in the workload model includes a pace of user communication.

6. The method of claim 1, wherein the set of analysis elements in the workload model includes an amount of work needed from the agent to engage in the user communication.

7. The method of claim 1, wherein the set of analysis elements in the workload model includes two or more of a messaging medium used to request the user communication, a time of day associated with a request, a topic of the request, a level of difficulty of the request, or a stage of the request.

8. The method of claim 1, wherein identifying the agent includes selecting the agent from a plurality of different agents that each have a different current aggregated workload capacity, wherein selecting the agent is based on a comparison of the different current aggregated workload capacity for each of the plurality of different agents.

9. The method of claim 1, wherein the agent is selected from a plurality of different agents that each currently handles a different number of communication slots.

10. The method of claim 1, wherein identifying the agent includes comparing the workload measurement to a workload capacity of the agent.

11. The method of claim 1, further including identifying an aggregated workload capacity of the agent based on a set of current simultaneous communications assigned to the agent, the set of current simultaneous communications corresponding to a current aggregated workload.

12. The method of claim 1, further including dynamically adjusting the workload measurement associated with the user communication as the user communication occurs.

13. The method of claim 1, further including dynamically adjusting an aggregated workload capacity of the agent, including the workload measurement for the user communication, based on a current real-time workload.

14. The method of claim 13, further including routing a next request to the agent based on the aggregated workload capacity.

15. A system comprising:
a memory that stores a workload model for a set of analysis elements associated with user communications, wherein the set of analysis elements are associated with a measurement of workload; and
one or more processors coupled to the memory and configured to perform operations including:
receiving an incoming request for a user communication, the incoming request including information regarding one or more analysis elements of the set of analysis elements;
identifying a workload measurement for the user communication based on comparing the incoming request to the workload model;
identifying an agent to handle the user communication, wherein the agent is identified based on a current workload capacity for the agent and the workload model indicating the agent as having the current workload capacity to handle a workload indicated by the workload measurement;
activating a communication slot for the agent, the communication slot defined based on the workload measurement;
initiating routing of the incoming request to the agent; and
setting the current workload capacity for the agent based on the workload measurement.

16. The system of claim 15, wherein the one or more processors are further configured to perform operations including identifying the current workload capacity of the agent based on a current aggregated workload associated with one or more simultaneous user communications currently handled by the agent.

17. A non-transitory computer readable medium comprising instructions that, when executed by one or more processors of a device, cause the device to perform operations for workload capacity routing comprising:
storing a workload model for a set of analysis elements associated with user communications, wherein the set of analysis elements are associated with a measurement of workload;
receiving an incoming request for a user communication, the incoming request including information regarding one or more analysis elements of the set of analysis elements;
identifying a workload measurement for the user communication based on comparing the incoming request to the workload model;
identifying an agent to handle the user communication, wherein the agent is identified based on a current workload capacity for the agent and the workload model indicating the agent as having the current workload capacity to handle a workload indicated by the workload measurement;
activating a communication slot for the agent, the communication slot defined based on the workload measurement;
routing the incoming request to the agent; and
setting the current workload capacity for the agent based on the workload measurement.

18. The non-transitory computer readable medium of claim 17, wherein setting the current workload capacity of the agent is based on aggregating the workload for the user communication with one or more simultaneous user communications currently handled by the agent.

19. The non-transitory computer readable medium of claim 17, wherein the instructions further cause the one or more processors to perform operations including:
dynamically adjusting an aggregated workload capacity of the agent, including the workload measurement for the user communication; and
routing a next request to the agent based on the aggregated workload capacity.

20. The non-transitory computer readable medium of claim 17, wherein the instructions further cause the one or more processors to perform operations including:
identifying an aggregated workload capacity of the agent based on a set of current simultaneous communications assigned to the agent, the set of current simultaneous communications corresponding to a current aggregated workload.

\* \* \* \* \*